US010037661B2

(12) United States Patent
Yu et al.

(10) Patent No.: US 10,037,661 B2
(45) Date of Patent: Jul. 31, 2018

(54) APPLICATIONS OF SYSTEMS AND METHODS FOR ELICITING CUTANEOUS SENSATIONS BY ELECTROMAGNETIC RADIATION

(71) Applicant: Pine Development Corporation, Mountain View, CA (US)

(72) Inventors: William J. Yu, Mountain View, CA (US); Alexander A. Brownell, Bountiful, UT (US)

(73) Assignee: Pine Development Corporation, Mountain View, CA (US)

( * ) Notice: Subject to any disclaimer, the term of this patent is extended or adjusted under 35 U.S.C. 154(b) by 0 days.

(21) Appl. No.: 15/479,155

(22) Filed: Apr. 4, 2017

(65) Prior Publication Data

US 2017/0206754 A1 Jul. 20, 2017

Related U.S. Application Data

(63) Continuation of application No. 15/269,705, filed on Sep. 19, 2016, now abandoned, which is a (Continued)

(51) Int. Cl.
*H04B 3/36* (2006.01)
*G08B 6/00* (2006.01)

(52) U.S. Cl.
CPC .................................... *G08B 6/00* (2013.01)

(58) Field of Classification Search
None
See application file for complete search history.

(56) References Cited

U.S. PATENT DOCUMENTS 4,795,224 A 1/1989 Goto
6,038,595 A 3/2000 Ortony
(Continued)

FOREIGN PATENT DOCUMENTS

WO WO2011052131 5/2011

OTHER PUBLICATIONS

Cayce, Infrared Neural Stimulation of Thalamocortical Brain Slices, IEEE Journal of Selected Topics in Quantum Electronics, vol. 16, No. 3, May/Jun. 2010, 8pgs.
(Continued)

*Primary Examiner* — Julie Lieu
(74) *Attorney, Agent, or Firm* — Phillips Ryther & Winchester; Jared L. Cherry

(57) ABSTRACT

Disclosed herein are a variety of multimodal sensory stimulation systems and related methods for providing multimodal sensory experiences to users. In various embodiments, a multimodal sensory stimulation may be configured to provide a tactile sensation using an optical stimulation system. The output of the optical stimulation system may selectively directed onto a target area of skin of the user to induct a tactile representation of a simulated object. A multimodal sensory component may provide a component in communication with the controller and configured to selectively deliver a multimodal sensory representation of the simulated object. In various embodiments, the multimodal sensory component may be configured to display a visual representation of the simulated object or to generate an aural representation of the simulated object. The sensory modalities may be adapted in time and intensity to create a sensory experience associated with the simulated object.

14 Claims, 25 Drawing Sheets

Related U.S. Application Data continuation of application No. 14/667,288, filed on Mar. 24, 2015, now Pat. No. 9,449,477.

(60) Provisional application No. 61/974,380, filed on Apr. 2, 2014.

(56) References Cited

U.S. PATENT DOCUMENTS

| | | | | |
|---|---|---|---|---|
| 6,115,482 | A | 9/2000 | Sears et al. | |
| 6,921,413 | B2 | 7/2005 | Mahadevan-Jansen et al. | |
| 7,488,341 | B2 | 2/2009 | Merfeld | |
| 7,736,382 | B2 | 6/2010 | Webb et al. | |
| 7,833,257 | B2 | 11/2010 | Walsh, Jr. et al. | |
| 7,883,535 | B2 | 2/2011 | Cantin et al. | |
| 7,883,536 | B1 | 2/2011 | Bendett et al. | |
| 7,951,181 | B2 | 5/2011 | Mahadevan-Jansen et al. | |
| 7,988,688 | B2 | 8/2011 | Webb et al. | |
| 7,994,468 | B2 | 8/2011 | Duijve et al. | |
| 8,012,189 | B1 | 9/2011 | Webb et al. | |
| 8,160,696 | B2 | 4/2012 | Bendett et al. | |
| 8,330,729 | B2 | 12/2012 | Tachi et al. | |
| 8,456,448 | B2 | 6/2013 | Rekimoto | |
| 8,562,658 | B2 | 10/2013 | Shoham et al. | |
| 8,574,280 | B2 * | 11/2013 | Yu | A61N 5/00 345/173 |
| 9,257,021 | B2 * | 2/2016 | Yu | G08B 6/00 |
| 2002/0002391 | A1 | 1/2002 | Gerdes | |
| 2006/0154216 | A1 | 7/2006 | Hafez et al. | |
| 2007/0060984 | A1 | 3/2007 | Webb et al. | |
| 2007/0179534 | A1 * | 8/2007 | Firlik | A61B 5/16 607/3 |
| 2007/0285402 | A1 | 12/2007 | Lim et al. | |
| 2008/0077200 | A1 | 3/2008 | Bendett et al. | |
| 2008/0269847 | A1 * | 10/2008 | Nemenov | A61B 5/0059 607/89 |
| 2008/0309487 | A1 * | 12/2008 | Chao | G08B 13/06 340/542 |
| 2009/0069871 | A1 | 3/2009 | Mahadevan-Jansen et al. | |
| 2009/0209896 | A1 | 8/2009 | Selevan | |
| 2009/0278798 | A1 | 11/2009 | Kim et al. | |
| 2010/0152794 | A1 | 6/2010 | Radivojevic et al. | |
| 2010/0262212 | A1 | 10/2010 | Shoham et al. | |
| 2010/0277696 | A1 | 11/2010 | Huebner | |
| 2010/0292758 | A1 | 11/2010 | Lee et al. | |
| 2011/0021272 | A1 | 1/2011 | Grant et al. | |
| 2011/0133910 | A1 | 6/2011 | Alarcon | |
| 2011/0150924 | A1 * | 6/2011 | Della Rocca | A61K 39/39 424/204.1 |
| 2011/0238141 | A1 | 9/2011 | Webb et al. | |
| 2011/0295331 | A1 | 12/2011 | Wells et al. | |
| 2012/0068952 | A1 | 3/2012 | Slaby et al. | |
| 2012/0147911 | A1 | 6/2012 | Dantus et al. | |
| 2012/0179228 | A1 | 7/2012 | DeCharms | |
| 2012/0229400 | A1 | 9/2012 | Birnbaum et al. | |
| 2012/0229401 | A1 | 9/2012 | Birnbaum et al. | |
| 2012/0302821 | A1 | 11/2012 | Burnett | |
| 2013/0013331 | A1 | 1/2013 | Horseman | |
| 2013/0072914 | A1 * | 3/2013 | Domankevitz | A61B 18/203 606/3 |
| 2013/0172965 | A1 * | 7/2013 | Yu | A61N 5/00 607/100 |
| 2014/0022162 | A1 * | 1/2014 | Yu | G06F 3/016 345/156 |
| 2014/0046423 | A1 * | 2/2014 | Rajguru | A61N 1/0456 607/144 |
| 2014/0236270 | A1 * | 8/2014 | Friend | A61F 2/14 607/92 |
| 2014/0306812 | A1 * | 10/2014 | Yu | G08B 6/00 340/407.1 |

OTHER PUBLICATIONS

Dummer, Development of VCSELs for Optical Nerve Stimulation, 7pgs., Feb. 18, 2011.

Industrynews, Eurotimes, vol. 16, Issue 6, p. 44, 1 pg., Jun. 2011.

Dittami, Intracellular calcium transients evoked by pulsed infrared radiation in neonatal cardiomyocytes, Journal of Physiology 589.6 (2011) pp. 1295-1306, 12 pgs.

Jindra, Epidermal laser stimulation of action potential in the frog sciatic nerve, Journal of Biomedical Optics 15(1), 015002-1-15002-6, Jan./Feb. 2010, 6pgs.

Kajimoto, Tactile Feeling Display using Functional Electrical Stimulation, Graduate School of Engineering, The University of Tokyo, ICAT 1999, Tokyo, Japan, 8pgs.

Lee, Virtual Surface Characteristics of a Tactile Display Using Magneto-Rheological Fluids, Open Access, Sensors 2011, ISSN 1424-8220, 12pgs.

L'Etang, The effect of Laser Wavelength in the Simulation of Laser Generated Surface Waves in Human Skin Model, Proceedings of the 28th IEEE, EMBS Annual International conference, NY, USA, Aug. 30-Sep. 3, 2006, 4pgs.

Rajguru, Infrared photostimulation of the crista ampullaris, Journal of Physiology 589.6 (2011) pp. 1283-1294, 12pgs.

Richter, Neural stimulation with optical radiation, Laser & Photonics Reviews 5, No. 1, 60-80, 2011, 13pgs.

Stockbridge, Focusing through dynamic scattering media, Optics Express 15087, vol. 20, No. 14, Jul. 2, 2012, 7 pgs.

Vellekoop, Phase control algorithms for focusing light through turbid media, Optics Communications 281 3071-3080, 2008, 10pgs.

Vellekoop, Focusing light through living tissue, Optical Coherence Tomorgraphy and Coherence Domain Optical Methods in Biomedicine XIV, 2010, 10pgs.

SUI, Visual Prosthesis for Optic Nerve Stimulation, May 29, 2009.

Wells, Application of infrared light for in vivo neural stimulation, Journal of Biomedical Optics 10(6), 064003-1-064003-12, Nov./Dec. 2005, 12pgs.

Wells, Optical Stimulation of neural tissue in vivo, Optics Letters, vol. 30, No. 5, p. 504-506, Mar. 1, 2005, 3pgs.

Wells, Optically Mediated Nerve Stimulation: Identification of Injury Thresholds, Wiley InterScience, Lasers in Surgery and Medicine 39:513-526, Jul. 23, 2007, 14pgs.

Wells, et al. Infrared nerve stimulation: Hearing by Light. BioOptics World, Nov. 1, 2008 (6pgs).

International Search Report of PCT/US2013/049141, dated Dec. 3, 2013.

Written Opinion of PCT/US2013/049141, dated Dec. 3, 2013.

Himmer, et al. Micromachined silicon nitride deformable mirrors for focus control, Optics letters, vol. 26, No. 16, Aug. 15, 2001.

Shao, 3-D Moems Mirror for Laser Beam Pointing and Focus Control, IEEE Journal of Selected Topics in Quantum Electronics, vol. 10, No. 3, May/Jun. 2004.

International Search Report of PCT/US2014/045327, dated Nov. 21, 2014.

Written Opinion of PCT/US2014/045327, dated Nov. 21, 2014.

Hoshi, Development of Aerial-Input and Aerial-Tactile-Feedback System. IEEE World Haptics Conference 2011, 978-1-4577-0297-6/11 pp. 569-573.

Iwamoto, et al., Two-Dimensional Scanning Tactile Display using Ultrasound Radiation Pressure. IEEE Symposium on Haptic Interfaces for Virtual Environment and Teleoperator Systems 2006.

Yoshino, et al. Visio-Acoustic Screen for Contactless touch Interface with Tactile Sensation. IEEE World Haptics Conference 2013.

* cited by examiner

2600

APPLICATIONS OF SYSTEMS AND METHODS FOR ELICITING CUTANEOUS SENSATIONS BY ELECTROMAGNETIC RADIATION

RELATED APPLICATIONS

This application is a continuation of U.S. patent application Ser. No. 15/269,705, filed on Sep. 19, 2016, and titled "APPLICATIONS OF SYSTEMS AND METHODS FOR ELICITING CUTANEOUS SENSATIONS BY ELECTROMAGNETIC RADIATION, which application is a continuation of U.S. patent application Ser. No. 14/667,288, filed on Mar. 24, 2015, and titled "APPLICATIONS OF SYSTEMS AND METHODS FOR ELICITING CUTANEOUS SENSATIONS BY ELECTROMAGNETIC RADIATION," which application claims the benefit under 35 U.S.C. § 119(e) of U.S. Provisional Patent Application No. 61/974,380, filed Apr. 2, 2014, and titled "APPLICATIONS OF SYSTEMS AND METHODS FOR ELICITING CUTANEOUS SENSATIONS BY ELECTROMAGNETIC RADIATION," each of which is incorporated herein by reference in their entireties.

DETAILED DESCRIPTION

Figure 1A:
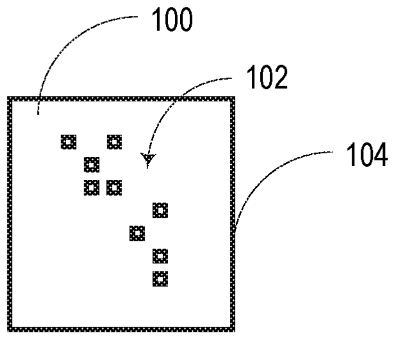
FIG. 1A shows an example of an adhesive registration mark that may be applied to a target area to indicate where cutaneous stimulation is acceptable consistent with embodiments of the present disclosure.

FIG. 1A shows an example of a registration mark 100 that may be applied to a target area to indicate where cutaneous stimulation is acceptable consistent with embodiments of the present disclosure. In some embodiments, the registration mark 100 may include an adhesive disposed on one side of the registration mark 100. The adhesive may be configured to removably adhere to a user's skin. This registration mark 100 may be a safety device ensuring that the system recognizes areas where direct stimulating energy may be directed with or without some spatial offset and may avoid directing stimulating energy onto tissue without such a marker. In one embodiment, the registration mark 100 may include a perimeter 104, within which stimulation energy may be imparted, but outside of which stimulation energy may not be imparted. Such a system may aid, for example, in avoiding accidentally imparting stimulation energy to a user's eye or other areas.

The system illustrated in FIG. 1A may be used in some embodiments of an electromagnetic cutaneous stimulation system (not shown) where tissue is stimulated in free space or on a two dimensional surface. In some embodiments, the registration mark 100 may also serve as part of a tracking system (not shown) to make determining and following the position of the tissue in space simpler. A pattern 102 may be disposed on the registration mark 100 to aid in the detection of a position and/or orientation of the registration mark 100.

In some embodiments, registration mark 100 may be identical at every tissue location where stimulation is permissible, while in other embodiments the registration mark 100 may be unique for each location. The registration mark 100 may be placed adjacent to the target tissue in some embodiments. In other embodiments, the registration mark 100 may be transparent to the stimulating wavelength and be placed directly over the target tissue. In some embodiments the registration mark 100 may be a single use item while in others it may be reused. In some embodiments, the user may be able to create and apply their own registration mark 100 that are learned by the tissue tracking device.

Figure 1B:
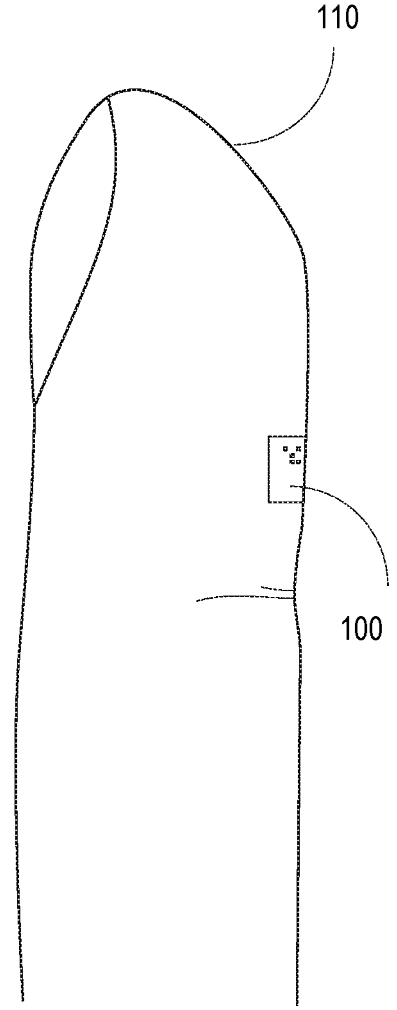
FIG. 1B shows a finger onto which the marker has been applied consistent with embodiments of the present disclosure.

FIG. 1B shows a finger 110 onto which the registration mark 100 has been applied consistent with embodiments of the present disclosure. The locating system (not shown) integrated with the stimulation system (not shown) may determine the spatial position of the marker and the tissue surrounding it. The system may then direct stimulation onto the tissue. In various embodiments in which a registration mark 100 is used, the stimulation system may be configured to avoid directing the stimulating beam onto tissue absent detection of the marker. In various embodiments, the registration mark 100 may be adjacent to the stimulation site rather than directly over the top of the stimulation site. In other embodiments, the registration mark 100 may comprise a material that is transparent to the electromagnetic energy used by the stimulation system. In such embodiments, the registration mark 100 may be placed directly over an intended area of stimulation and tissue beneath the registration mark 100 may be stimulated.

Figure 2C:
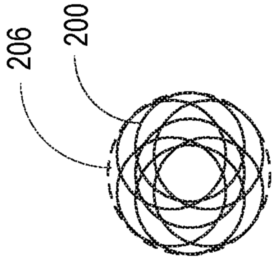
FIG. 2C shows a stimulation point comprising seven sub-points with significant overlap consistent with embodiments of the present disclosure.
Figure 2B:
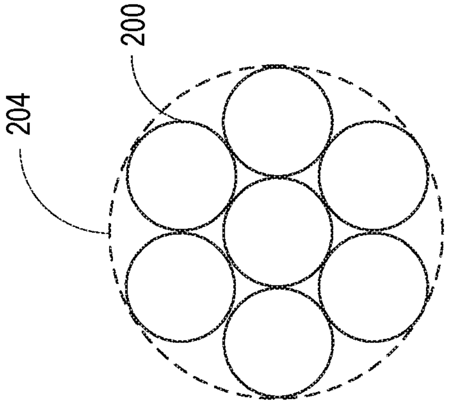
FIG. 2B shows a stimulation point comprising seven sub-points that are immediately adjacent to one another with minimal or no overlap consistent with embodiments of the present disclosure.
Figure 2A:
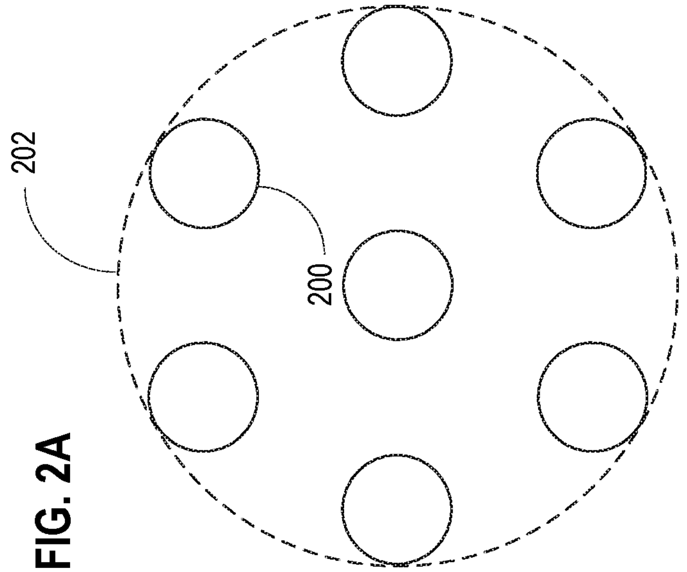
FIG. 2A shows a stimulation point comprising seven sub-points that are located relatively far apart so that there is no overlap of the individual sub-points within the stimulation point consistent with embodiments of the present disclosure.

FIGS. 2A-2C illustrate a stimulation point 202 comprising seven sub-point 200 locations, each of which may be delivered either simultaneously or in close succession all contributing to a single point of sensation. The stimulation point 202 is shown in dashed lines to indicate that it may correspond to an approximate area perceived by the user as being stimulated, even though in some embodiments, stimulation energy is not directed to the entire area. Light-induced cutaneous stimulation may be created by points of illumination and/or by a continuous movement of a modulated beam. In the case of discrete points of illumination, each point of sensation may be created by a single illumination and/or by many points of illumination within an area where points of sensation are tactilely indiscriminable. As used herein, the term sub-points refers to multiple points of illumination that collectively contribute to a single point of sensation. These sub-points may or may not overlap each other. The sensation quality as well as intensity may be modulated by changing the number of sub-points as well as the sub-point spacing. Any number or arrangement of sub-points may be employed to create and to change the quality of the perceived sensation.

FIG. 2A shows a stimulation point 202 comprising seven sub-points that are located relatively far apart so that there is no overlap of the individual sub-points within the stimulation point 202 consistent with embodiments of the present disclosure. In some embodiments, the distance between the plurality of sub-points may be perceived by a user as corresponding to a level of intensity of a stimulation, as corresponding to a heating, and/or as corresponding to the sharpness of a sensation. For example, the stimulation point 202 illustrated in FIG. 2A, may be perceived as being relatively weak and/or dull.

FIG. 2B shows a stimulation point 204 comprising seven sub-points that are immediately adjacent to one another with minimal or no overlap consistent with embodiments of the present disclosure. In comparison to the stimulation point 202 illustrated in FIG. 2A, the stimulation point 204 illustrated may be perceived as being stronger and/or more sharp. In some embodiments, stimulation point 204 may be perceived as having a higher intensity and/or a higher temperature than stimulation point 202.

FIG. 2C shows a stimulation point 206 comprising seven sub-points with significant overlap consistent with embodiments of the present disclosure. In comparison to the stimulation point 204, stimulation point 206 may be perceived as being stronger and/or more sharp. In some embodiments, stimulation point 206 may be perceived as having a greater intensity and/or higher temperature than stimulation point 204.

Use of sub-points, or a procession of repeated stimulation, may induce certain sensations while minimizing undesired sensations and excessive tissue heating. In addition to the use of such sub-points, the variations in their use may be a useful tool in creating a variety of sensations within a single stimulated object. Variable numbers of sub-points, either throughout an entire shape or in neighboring sensation points, may assist in eliciting a desired tactile sensation. In addition to varying the number of sub-points, the spacing between sub-points or the level of overlap between such sub-points may also affect the sensation perceived by a user. Still further, manipulation of the timing between sub-points may allow for a unique sensation to be elicited.

Figure 3:
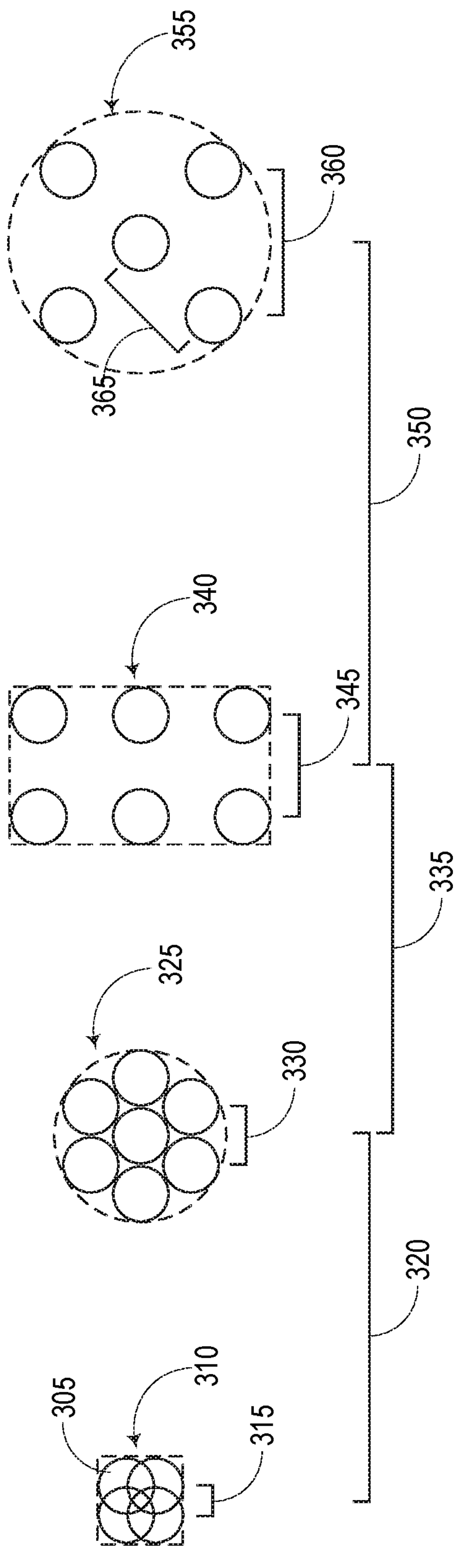
FIG. 3 illustrates a short straight line of sensation created by a series of sensation points stimulated by using a variable number and configuration of sub-points consistent with embodiments of the present disclosure.

FIG. 3 illustrates a short straight line of sensation created by a series of sensation points stimulated by using a variable number and configuration of sub-points consistent with embodiments of the present disclosure. An open circle 305 represents a point of illumination for the stimulation of tissue. The first sensation point 310 shows a grouping of four overlapping sub-points arranged evenly in a square pattern with a tight sub-point spacing indicated by 315. The second sensation point 325 is separated from the first by a distance 320. The sensation point 325 is created by 7 sub-points arranged in a non-overlapping and radially symmetric fashion separated by a distance 330 that is equal to the diameter of the illuminated spot. Separated from the second sensation point by a distance 335, the third sensation point 340 shows a non-symmetric grouping of sub-points each separated from the other by a distance 345, greater than the diameter of the illuminated spot. The third sensation point is separated from the fourth by a distance 350. The fourth sensation point consists of an arrangement of 5 sub-points arranged symmetrically; however, there exist two different sub-point spacing measurements, 360 and 365. The represented sub-point arrangements and spacings are not meant to be exhaustive, and many other sub-point architectures are possible.

Figure 4C:
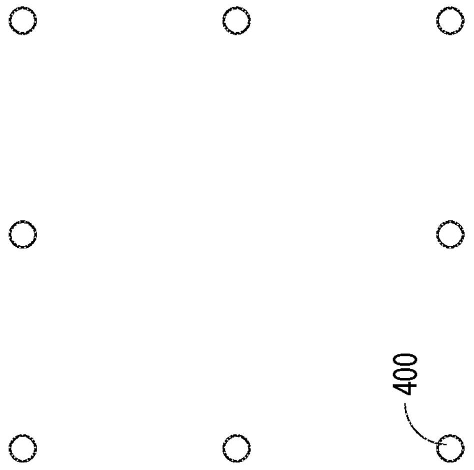
FIG. 4C illustrates a square pattern of FIG. 4B after additional time has passed, and a further plurality of stimulation points has been removed from the shape.
Figure 4B:
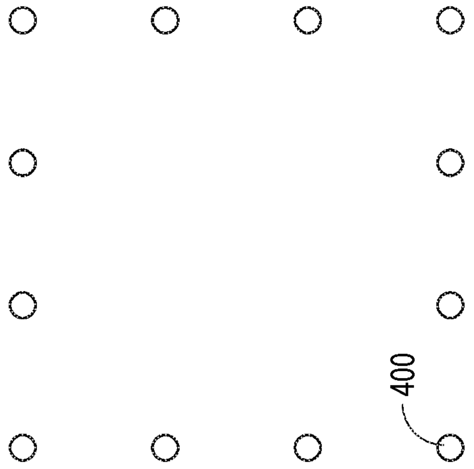
FIG. 4B illustrates the square pattern of FIG. 4A after sufficient time has passed for the user to recognize the shape, and a plurality of points of stimulation may be removed.
Figure 4A:
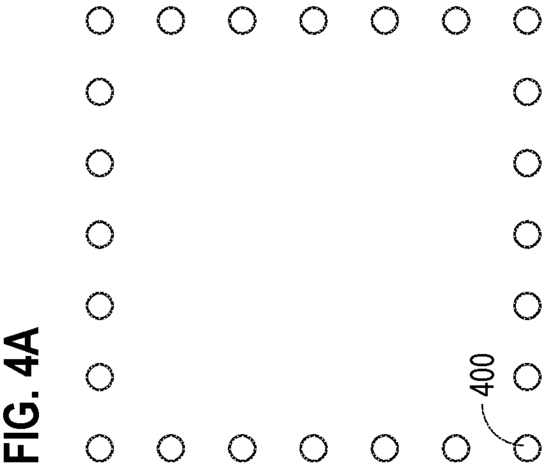
FIG. 4A illustrates a square pattern having seven stimulation points disposed along each side consistent with embodiments of the present disclosure.

FIGS. 4A-4C illustrate a progression over time of a plurality of stimulation points in the shape of a square. When creating a persistent sensation in a certain shape it may be initially beneficial to use a greater number of stimulation points than is necessary to sustain the sensation thereafter. The initial stimulation consisting of a greater number of points of stimulation and sensation may distinctly define the shape. After the shape is distinctly defined and perceived by a user, fewer stimulation points may be used to maintain a persistent sensation.

FIG. 4A illustrates a square pattern having seven stimulation points disposed along each side consistent with embodiments of the present disclosure. FIG. 4B illustrates the square pattern of FIG. 4A after sufficient time has passed for the user to recognize the shape, and a plurality of points of stimulation may be removed. In spite of the removal of some of the stimulation points, the user may perceive the shape as remaining the same. FIG. 4C illustrates a square pattern of FIG. 4B after additional time has passed, and a further plurality of stimulation points has been removed from the shape. Again, the user may continue to perceive the shape as being persistent in spite of the reduction in the number of stimulation points from 7 points per side in FIG. 4A to 3 points per side in FIG. 4C.

FIGS. 4B and 4C illustrate how multiple points of stimulation within the shape might be removed while maintaining a sufficiently similar sensation. This concept may be applied to sub-points as well. In other words, the number of sub-points used to create an initial sensation may be changed after the initial sensation is established without changing the sensation perceived by the user. Reducing the number of points used to maintain a sensation may be beneficial for reducing heating in the stimulated tissue, avoiding over-stimulation, and reducing power consumption of a stimulation system.

In certain embodiments where there is close proximity of adjacent points of sensation such as, but not limited to, a sharp corner, there is natural accentuation and increase in the sensation intensity due to geometric design of the pattern. In such cases, a designer can remove sensation points and/or reduce the number sub-points per sensation point at those locations to even out or reduce the sensation intensity compared to the rest of the pattern. In contrast, there may be times that there is a desire to purposely intensify or accentuate the sensation where there is no natural accentuation due to geometry such as, but not limited to, a straight line. In some embodiments, this can be done by, but is not limited to, increasing the output power, pulse width, pulse frequency, duty cycle, and waveform. In another embodiment, it can be done by adjusting geometric-based parameters such as, but not limited to, the number of sub-points with a point of sensation, sub-point spacing, time between sensation group illumination, or sensation point patterning biasing or clustering, number of sensation groups illuminated together, and rastering patterning biasing and/or repeating or skipping of illumination of certain points and/or sub-points.

Offsetting the tactile stimulation spatially on the tissue may be beneficial for the maintenance of a sensation while not inducing overly high temperatures, avoiding overstimulation effects, minimizing physiologic adaptation, and reducing power consumption. This offset may be accomplished by changes of the stimulation points within the shape or by slight movements of the entire shape. In the first case, local spatial offsets, the points of stimulation creating a shape are separated by a given distance in which there is initially no stimulation. In this space, the tissue may be stimulated at a later point to minimize overheating and overstimulation of the initial stimulation points. There could be multiple such points of subsequent stimulation. This could also loop back to the point of initial stimulation and re-stimulate following such a pattern. In the case of global spatial offsets, the entire shape is moved to a new location. This is done in such a way as to preserve the intended sensation while stimulating new portions of the tissue. In conjunction with the movement of stimulation locations, tissue stimulation parameters may be modulated such as, but not limited to, stimulation intensity or output power, pulse width, pulse frequency, waveform, spot size, sensation point spacing, and number of sub-points, and sub-point spacing, among others.

Figure 5A:
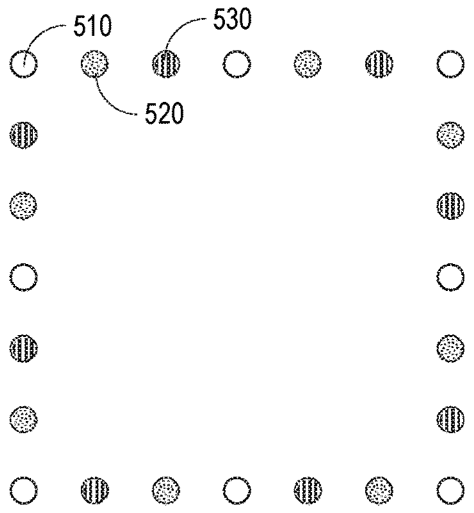
FIG. 5A shows an example of spatial offsets where the shape being outlined is a square consistent with embodiments of the present disclosure.

FIG. 5A shows an example of spatial offsets where the shape being outlined is a square consistent with embodiments of the present disclosure. The initial stimulation pattern shows the corners of a square and a point in the center of each connecting line represented by the open circles 510. The second set of stimulation points 520, which are designated by filled circles with speckles, may be disposed at slightly different points along the same lines of the square. The third set of stimulation points in this example are represented by circles filled with stripes 530. In succession these points can be singly or repeatedly stimulated in such a way that the entire shape is sensed in the desired way while minimizing stimulation at any one point on the tissue.

Figure 5B:
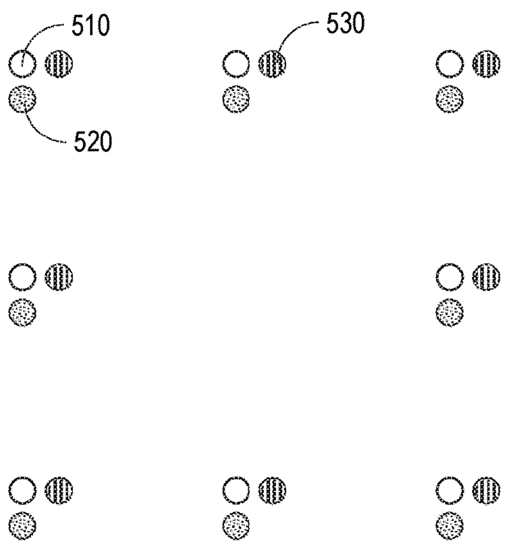
FIG. 5B shows another example of global spatial offsets for a square stimulation pattern consistent with embodiments of the present disclosure.

FIG. 5B shows another example of global spatial offsets for a square stimulation pattern consistent with embodiments of the present disclosure. Open circles 510 represent the first points of stimulation. The next points of stimulation represented by the spotted circles 520 are all translated directly down from the first position. The third points of stimulation represented by striped circles 530 are translated immediately to the right of the original points of stimulation. Many other movements of entire shapes may also be used in a similar manner. In this example, the movement may minimize stimulation of certain points of the tissue while maintaining a sensation. Offset patterns may be utilized to minimize tissue overstimulation while maintaining a desired static sensation or to create the sensation of movement.

There may at times be benefit in stimulating different portions of the tissue in succession to create and maintain a given sensation. One possible reason for this movement of the stimulation is to avoid buildup of excessive heat in the tissues. Another possible reason is to minimize physiologic adaptation to the stimulus. It has previously been disclosed that discrete points of stimulation may be moved around within the pattern or outline of the given shape to accomplish this goal. Here we describe a method of magnification or demagnification of the shape for this purpose. In delivering a shape which has an outline and is completely or largely hollow, it is possible to magnify or demagnify this shape to some degree such that different portions of the tissue are stimulated but that the sensation remains unaltered.

Figure 6:
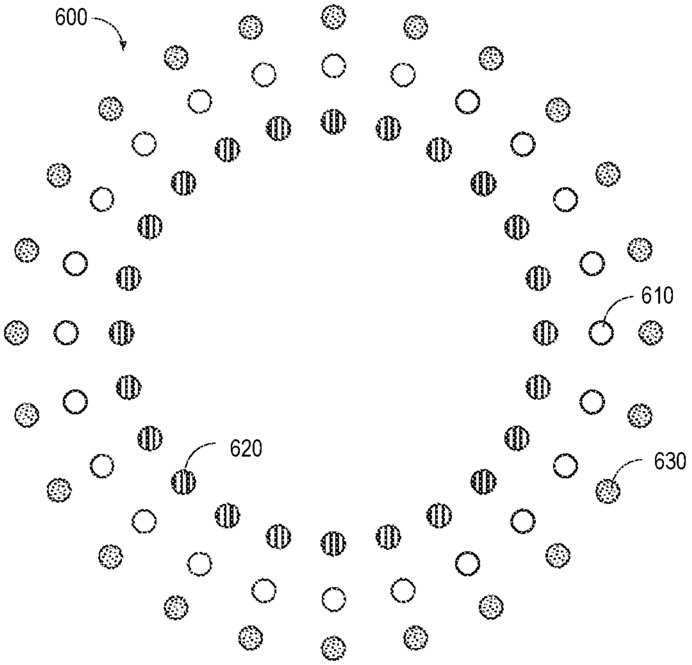
FIG. 6 shows a circle created by a series of distinct sets of stimulation points disposed in concentric circles that may be stimulated over a period of time consistent with embodiments of the present disclosure.

FIG. 6 shows a circle 600 created by a series of distinct sets of stimulation points disposed in concentric circles that may be stimulated over a period of time consistent with embodiments of the present disclosure. The first circle may correspond to the first set of circles 610. The second set of stimulation points has a slightly smaller radius and may correspond to the set of circles 620. Stimulating these points may maintain a sensation recognized as the original circle while stimulating new tissue. The third set of stimulation points has a slightly larger radius and may correspond to the set of circles 630. The time window between stimulating a first set of points and a second set of points may be based on calibration data obtained from the user and/or population data or it may be based on predictive model results such as, but not limited to, finite element or finite difference methodologies. Such timing may aid in maintaining a persistent sensation in spite of movement in the stimulation points associated with different stimulation sets. Further, in some embodiments, different stimulation points corresponding to an area of a persistent sensation may be located within a distance that is indistinguishable to a user. For example, the distance between a corresponding point associated with the first set of stimulation points and the second set of stimulation points may be based on, but not limited to, a thermal relaxation time constant. Various factors may affect the thermal relaxation time constant, including, but not limited to, density of tissues, tissue and blood specific heat, tissue thermal conductivity, blood flow rate, arterial blood temperature, ambient temperature, metabolic heat generation, heat transfer coefficient, tissue surface temperature, surface topography, ratio of tissue surface to mass, contact with other surfaces, and the like.

In some embodiments, a system may change the stimulation energy for one or more sets of stimulation points to maintain a constant sensation perceived by the user. In some embodiments, the number of stimulation points may be identical, while in other embodiments, the number of stimulation points may vary according to the physiologic response. Magnification and/or contraction of a stimulation pattern may also be useful in cases where the shape is not hollow, but has an interior with stimulation points. Similar treatment may be given to the edges of the shape while the interior stimulation points may be rearranged to accomplish the goal of steady predictable sensation.

Figure 7A:
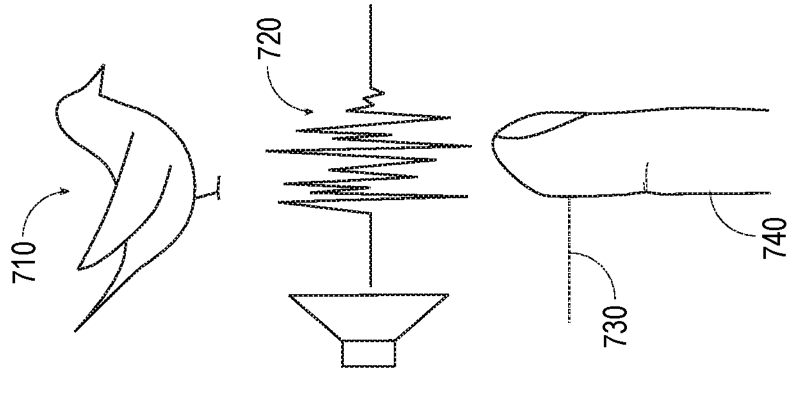
FIG. 7A shows a representation of three different sensory modalities consistent with embodiments of the present disclosure.
Figure 7B:
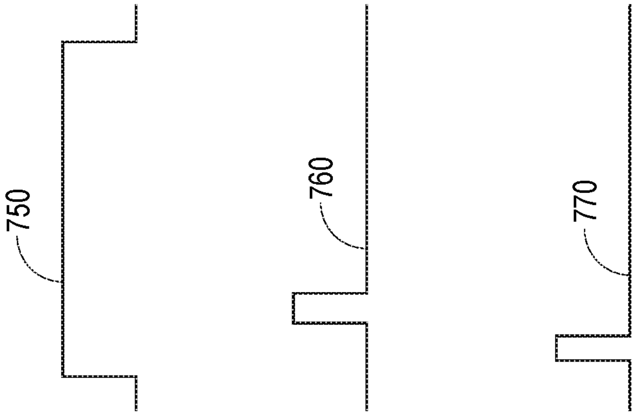
FIG. 7B shows a possible temporal grouping of the different sensory modalities of FIG. 7A consistent with embodiments of the present disclosure.
Figure 7C:
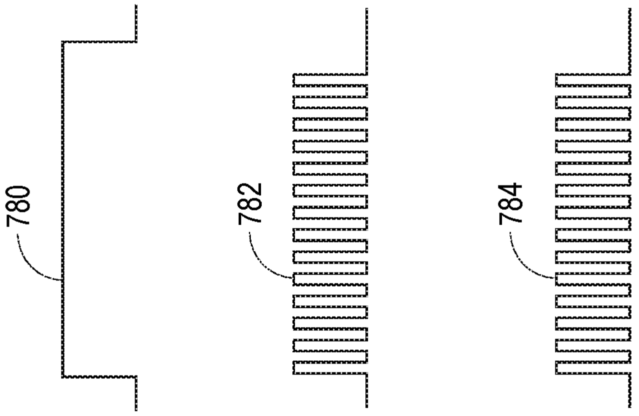
FIG. 7C illustrates a single image that is represented for a longer duration while individual tactile sensations and sounds are presented multiple times.

FIGS. 7A-7C illustrate a multimodal sensory stimulation system consistent with embodiments of the present disclosure. Multimodal sensory integration provides multiple sensory inputs to create a complete sensory experience and a cohesive mental representation for a user. In some cases a single sensory experience is incomplete and may not be immediately understood in isolation. For example, tactile stimulation may be missing from visual and audio media. In various embodiments consistent with the present disclosure, tactile sensation may augment the visual and aural sensations to create a more realistic and more complete mental representation for the user. Additionally, a visual representation or aural cues may enhance or diminish the tactile sensation. For example, sounds may strengthen or weaken the tactile sensation depending on such factors as, but not limited to, volume, pitch, onset, duration, crescendo and decrescendo. Attention plays a large part in a perception of any of the sensory modalities. A balance of the various sensory modalities may shift the attention of the user to one modality at any given moment. Also, one modality may be used to strengthen or weaken the perception of another sense.

FIG. 7A shows a representation of three different sensory modalities consistent with embodiments of the present disclosure. An image 710 may be presented to the user, together with a sound 720, and a tissue 740 is stimulated using a tactile stimulation 730. FIG. 7B shows a possible temporal grouping of the different sensory modalities of FIG. 7A consistent with embodiments of the present disclosure. Signal 750 may represent the onset and offset of the presentation of the image 710. Signal 760 shows the onset and offset of the presentation of the sound 720. Signal 770 shows the onset and offset of the tactile stimulation 730. In various embodiments, representations of an image may be a static image or a dynamic image (e.g., a video).

In this example the onset of the presentation of the image 710 and the tactile stimulation 730 are nearly simultaneous while presentation of the sound 720 is delayed. The relative timing of the sensory modalities may be adjusted in various embodiments to produce the desired effect. FIG. 7C illustrates a single image that is represented for a longer duration while individual tactile sensations and sounds are presented multiple times. Signal 780 may represent the onset and offset of the presentation of the image 710, signal 782 may represent the onset and offset of one or more sounds 720 at a plurality of times, and signal 784 may represent the onset and offset of one or more tactile stimulation 730 profiles at a plurality of times.

Multisensory integration may result in a sensory illusion where one sense is experienced in conjunction with other senses even when a true stimulus is absent. It may be possible to train a user to experience such sensory illusions by a period of associative experience. As the sensations from multiple senses are experienced together, they may become linked in the consciousness of the user. After this initial association is established, in various embodiments it may be possible to diminish or even remove one of the sensory stimuli while leaving the others the same. By association, the user may still perceive the full experience as unchanged and not discerning any diminution of stimulation. In such embodiments, various benefits may be realized by use of associative experience. Lessening the tactile tissue stimulation may reduce the power consumption of the tactile stimulation system, minimize tissue temperature elevations, and reduce unnecessary tissue exposure. Strengthening such sensory illusions may also enhance the reality of the experience.

Figures 8A, 8B, 8C, 8D:
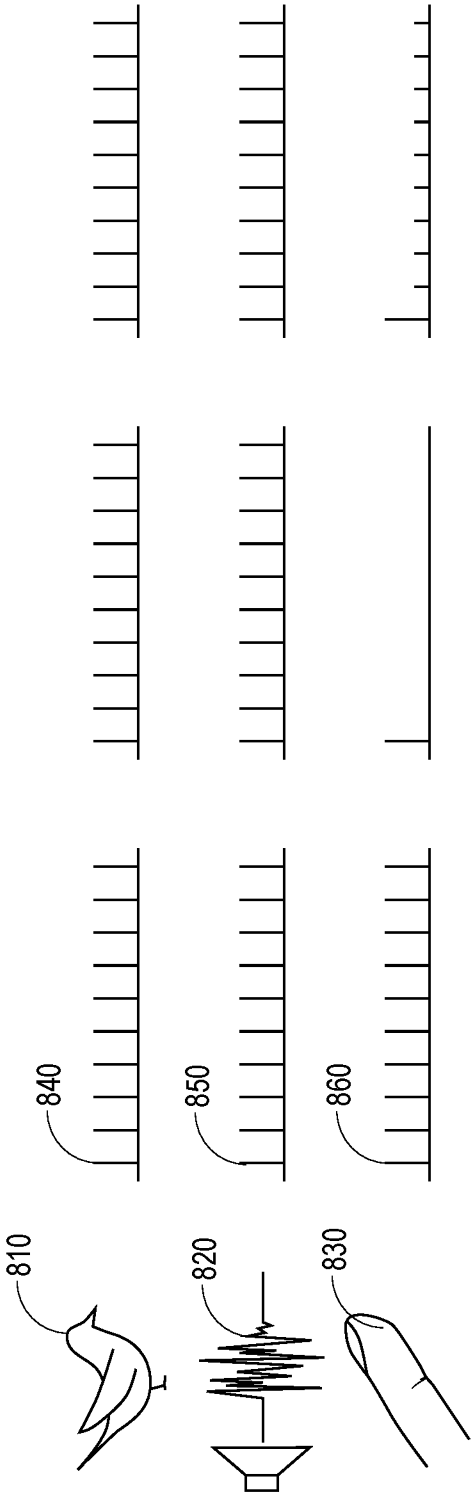
FIG. 8A shows three modalities of sensory input which may be linked together, namely visual imagery, audio cues, and tactile stimulation using an optical stimulation system consistent with embodiments of the present disclosure.
FIG. 8B shows a period of associative experience where all three modalities are present, which each vertical line represents an instance of sensory stimulation.
FIG. 8C shows a situation where, after the initial period of associative experience the tactile stimulation is used only once consistent with embodiments of the present disclosure.
FIG. 8D illustrates a situation in which after an initial tactile stimulation at a first level, the tactile stimulation is diminished in intensity consistent with embodiments of the present disclosure.

FIGS. 8A-8C illustrates various conceptual representations of embodiments for inducing a tactile illusion by associative experience. FIG. 8A shows three modalities of sensory input which may be linked together, namely visual imagery 810, audio cues 820, and tactile stimulation 830 using an optical stimulation system consistent with embodiments of the present disclosure. FIG. 8B shows a period of associative experience where all three modalities are present, which each vertical line represents an instance of sensory stimulation, visual 840, audio 850 and tactile 860. One or more stimuli may be temporally identical or may have some offset. During this initial period, all of the stimuli may be present and at full intensity.

FIG. 8C shows a situation where, after the initial period of associative experience the tactile stimulation is used only once consistent with embodiments of the present disclosure. The user may continue to experience a tactile component while eliminating some or all of the stimuli that would otherwise be necessary in the absence of a multisensory presentation. In some embodiments, the initial tactile stimulus may be necessary, while in others it may not be. In some embodiments, only periodic stimulation is necessary to maintain the tactile experience.

FIG. 8D illustrates a situation in which after an initial tactile stimulation at a first level, the tactile stimulation is diminished in intensity consistent with embodiments of the present disclosure. Various embodiments may utilize strategies such as, but not limited to, lower energy delivered, fewer points of stimulation, and/or different areas of stimulation. As described above, an initial stimulus may or may not be necessary after the initial association is established.

Multisensory integration may supplement and clarify tactile comprehension in the case of tactile stimulation using an optical stimulation system. In some cases, a visual overlay of moving shapes on static or dynamic images such as, but not limited to, photographs and videos, may align with the tactile stimulation to assist in the conscious understanding of the tactile image being created. In some embodiments, correlates of the stimulation points are represented on a display in a one-to-one relationship. In other embodiments, the dynamic visual display may have little relationship to the actual stimulation points, but may serve the same function of reinforcing the tactile experience.

Figure 9:
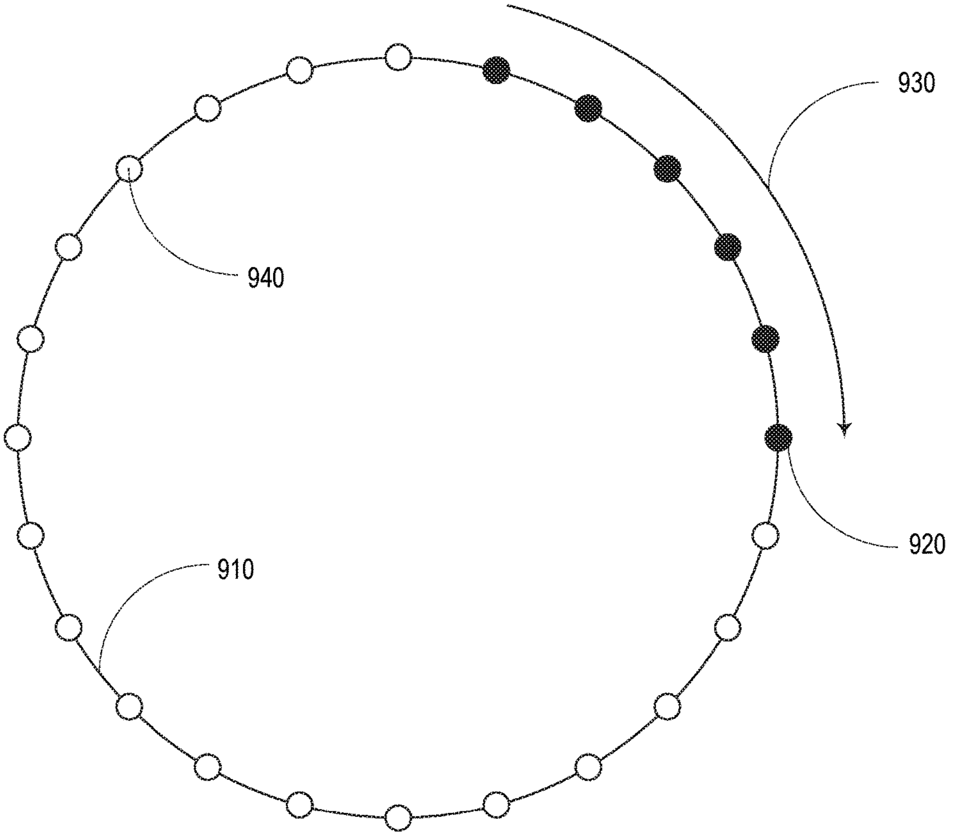
FIG. 9 illustrates a stimulation pattern comprising a circle created using an optical stimulation system consistent with embodiments of the present disclosure.

FIG. 9 illustrates a stimulation pattern comprising a circle created using an optical stimulation system consistent with embodiments of the present disclosure. The image of a corresponding circle 910 may be presented on a visual display associated with a device such as, but not limited to, a computer monitor or a touch screen display. Points, represented by filled small circles 920, may correspond to the stimulation points on the tissue and may be displayed over the image of the shape being stimulated. The image of the stimulation points may continue to grow or move in the direction shown by the arrow 930. Points yet to be displayed are shown as small open circles 940. The timing of such an overlay depends highly on the timing of the stimulation. The visual display may be temporally offset from the actual stimulation in order to emphasize the tactile experience or to accommodate any latency of sensation onset. The visual enhancements need not be limited to points overlain. The visual enhancements may be any number of things such as, but not limited to, a solid curve, blinking or flickering of visual cues, dynamic shape changes of stimulation points and/or illumination pathways, forward or anticipatory tactile patterning or cues, patterning sweeps, brightening or dimming (variable contrast) of visual cues, moving line, moving point, or other animation. Colors may also impact the perceived tactile sensation and may be used accordingly.

When drawing a pattern that involves an abrupt change in direction, such as, but not limited to, the corner of a square or triangle, changing the speed of stimulation at and around those points may aid in user recognition of such features. This velocity behavior can be further modified by adjusting additional stimulation parameters.

Figure 10C:
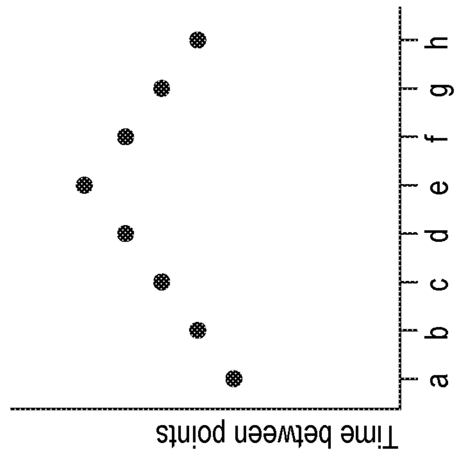
FIG. 10C illustrates a graph of another example of a time varying stimulation profile associated with the stimulation pattern illustrated in FIG. 10A that emphasizes a corner consistent with embodiments of the present disclosure.
Figure 10B:
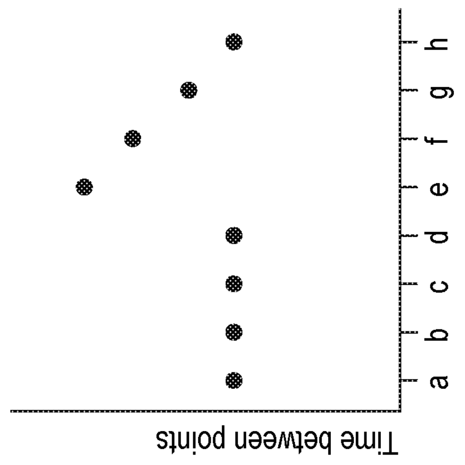
FIG. 10B illustrates a graph of one example of a time varying stimulation profile associated with the stimulation pattern illustrated in FIG. 10A that emphasizes a corner consistent with embodiments of the present disclosure.
Figure 10A:
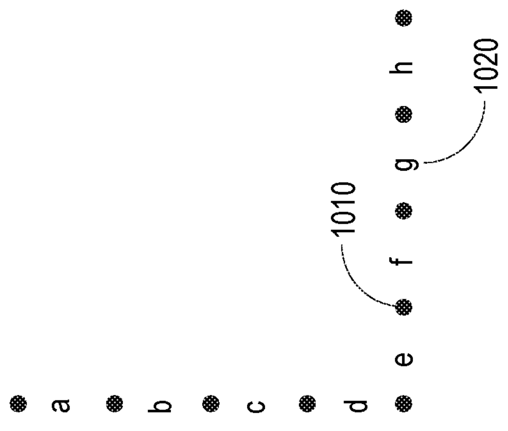
FIG. 10A shows a series of distinct stimulation points as closed circles in order from top to bottom then left to right with some amount of time represented as letters consistent with embodiments of the present disclosure.

FIGS. 10A-10C illustrate use of decreasing and increasing time intervals between sensation points or groups of sensation points at a 90 degree turn in a stimulation profile consistent with embodiments of the present disclosure. These examples are illustrative of the use of stimulation speed and are not meant to fully enumerate the possible permutations used in the system. FIG. 10A shows a series of distinct stimulation points as closed circles 1010 in order from top to bottom then left to right with some amount of time represented as letters 1020 consistent with embodiments of the present disclosure. FIG. 10B illustrates a graph of one example of a time varying stimulation profile associated with the stimulation pattern illustrated in FIG. 10A that emphasizes a corner consistent with embodiments of the present disclosure. The time between points is equal at points "a," "b," "c," and "d" (i.e., as the stimulation approaches the corner). This pattern of stimulation may be referred to as a constant velocity of stimulation. Points "e," "f," and "g," (i.e., as the stimulation comes around the corner) have a longer time between the stimulation points. The time between the points is initially much longer, steadily decreasing to that of the pre-corner length. This change in the time between the points of stimulation creates an abrupt change in the stimulation velocity, followed by a moderate acceleration back to that initial speed.

FIG. 10C illustrates a graph of another example of a time varying stimulation profile associated with the stimulation pattern illustrated in FIG. 10A that emphasizes a corner consistent with embodiments of the present disclosure. In FIG. 10C, the speed of stimulation steadily decreases into the corner and increases out of the corner. There may be many other variations of stimulation speed that aid in the comprehension of a tactile sensation.

Figure 11:
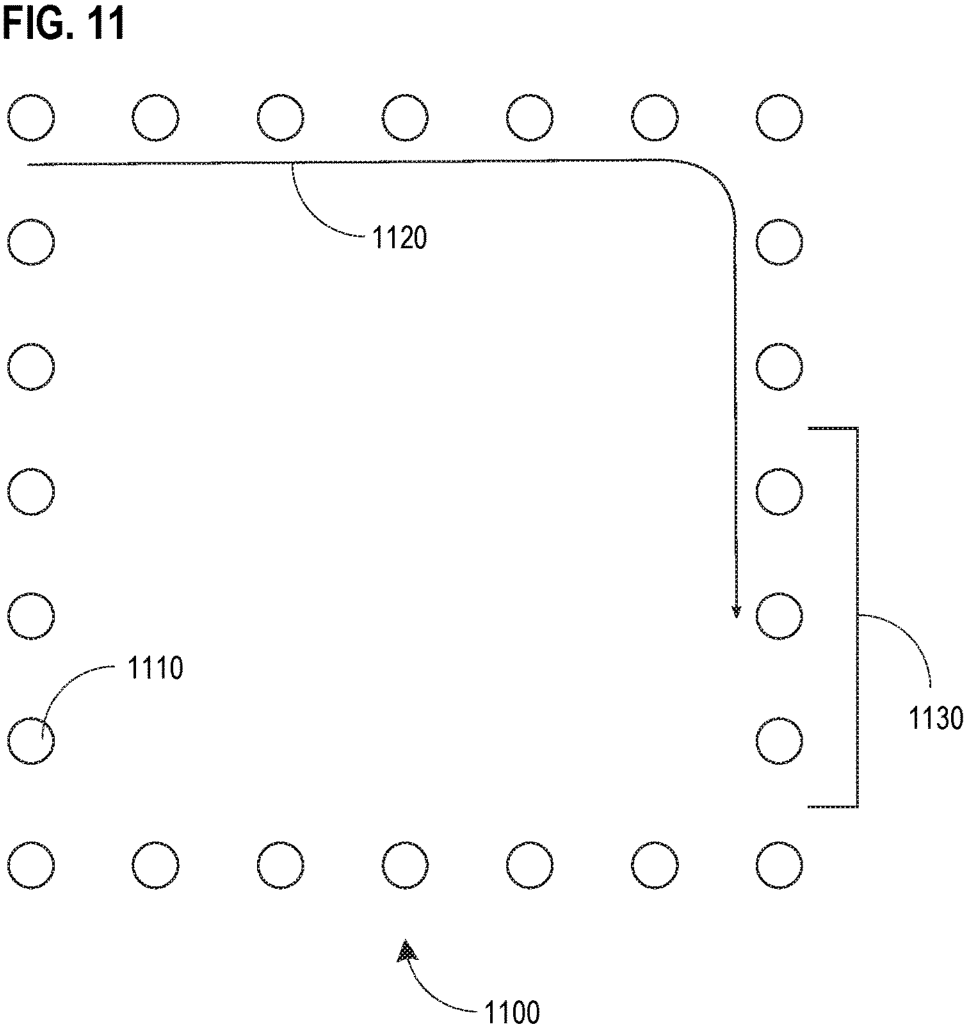
FIG. 11 shows a square shape created from a plurality of stimulation points consistent with embodiments of the present disclosure.

FIG. 11 shows a square shape 1100 created from a plurality of stimulation points 1110 consistent with embodiments of the present disclosure. Tactile sensations may be created in any number of ways. In some embodiments, an optical stimulation system may include multiple optical sources. In such embodiments, an entire image may be created by stimulating all sensation points at one time. In other embodiments with a limited number of light sources, the sensation points may be stimulated sequentially. Stimulation of various points may be performed within a short enough span of time that the user may perceive the stimulation as being simultaneous. In some instances, however, the recognition of certain shapes may be more effective when a sequential series of points are stimulated sufficiently slowly such that the user perceives the sequence as if the stimulation profile is being drawn across stimulated tissue.

When the points 1110 are stimulated simultaneously, the resulting sensation may be perceived as an outlined square. In contrast, when points 1110 are sequentially stimulated, as indicated by the arrow 1120, with enough time between each point to allow the user to detect a movement of sensation, the user's perception may differ. The user may first perceive a first line, followed by perceiving a second line that is oriented perpendicular to the first line. A third line may then be perceived that is perpendicular to the second line. Finally, a fourth line may then be perceived that is perpendicular to the third line. The user may then recognize that the lines form a square.

Patterning movement of the points 1110 of stimulation around the perimeter of the square 1100 may be performed in variety of ways. For example, one point at a time may be stimulated. In another example, a number of sensation points may be grouped together as shown by the bracket 1130. Such techniques may be applied not only to outlines, but also to more complex shapes. Movement of sensation may provide the advantage of a more natural or more comprehensible experience for the user.

A variety of shapes may be created by the stimulation of tissue at different times. One method of creating the sensation of movement is to take a series of stimulation patterns and stitch them together in time much like the frames of a movie. Frames, in this context, may contain both static and dynamic tactile sensations and may be of variable length. This technique of scripting one sensation after another allows for the creation of a series of relatively simple shapes or sensations to be created and placed in frames rather than requiring a single large spatially and temporally complex object to be created. Other parameters can be modulated from frame to frame including, but not limited to, output power, pulse width, pulse frequency, duty cycle, waveform, sub-point spacing, sensation point spacing, number of sub-points, time between sensation groups, and rastering pattern. Such parameters, together with other parameters that may be varied in an optical stimulation system, may be referred to herein as stimulation parameters. Any and all stimulation parameters may be employed within any frame to create a desired stimulation profile.

Figure 12:
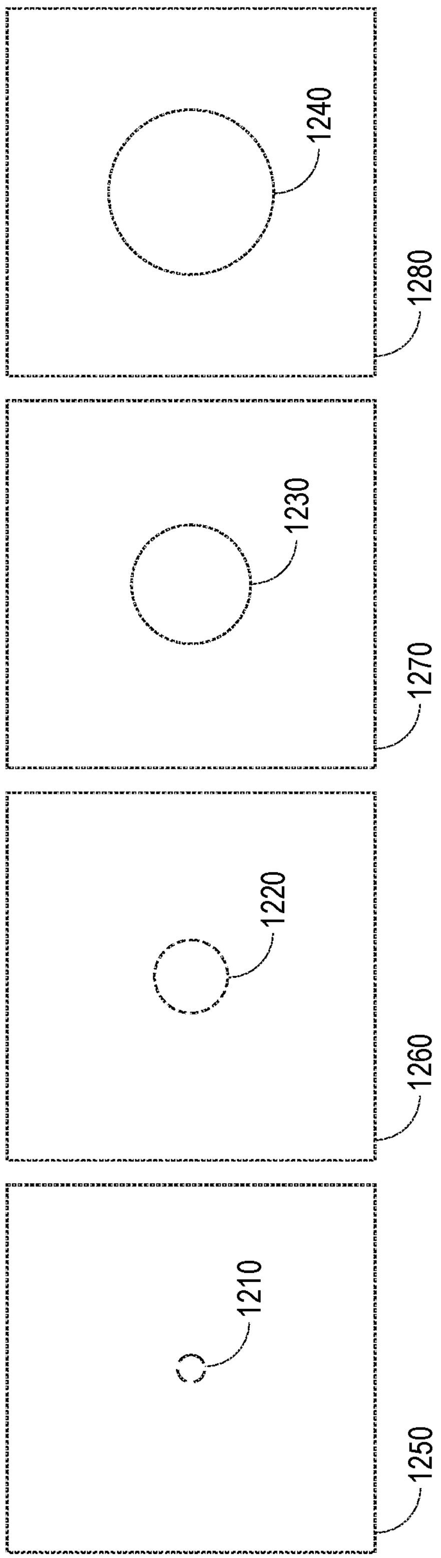
FIG. 12 illustrates a series of four frames in which a series of simple shapes are stimulated sequentially consistent with embodiments of the present disclosure.

FIG. 12 illustrates a series of four frames 1250-1280 in which a series of simple shapes 1210-1240 are stimulated sequentially consistent with embodiments of the present disclosure. The time between each frame may be set individually to create the desired sensory experience. The intensity and quality of sensation for each shape may also be set individually by varying one or more stimulation parameters. Scripts may be set to run in a single sequence or be allowed to repeat a specified number of times or to repeat indefinitely. As the frames 1250-1280 repeat, the time between the final frame (e.g., frame 1280) in the series and the first frame (e.g., frame 1250) in the series may also be variable.

Sensation authoring tools may be provided to designers and programmers to allow for control over the sensations delivered to the user. In some embodiments, sensation authority tools may prevent direct access to the actual stimulation parameters. Rather, developers may request certain levels of sensation intensity and different types of sensation while the sensation authoring tool creates the stimulation parameters that are thoroughly checked for safety. For example, if the designer attempts to overlay two points of stimulation, the sensation authoring tools may limit the exposure by either eliminating one of those points or by lessening the intensity of the delivered stimuli. The repetition of sensation may be limited and the stimulation of subsequent iterations may be diminished to a safe level that also maintains the desired sensation. The sensation authoring tools may disallow access to low level settings for parameters such as, but not limited to: the stimulation beam intensity or output power, pulse widths, frequencies, wavelengths, sensation point spacing, number and configuration and spacing of sub-points, beam diameter and profile, and local and global offsets. Instead, the sensation authoring tools may provide the ability to create shapes, textures, edge characteristics, determine sensation sweep speeds, and the order of stimulation. The designer may further be allowed to request various levels of intensity at any point in the created shapes, but such requests may be limited in some circumstances (e.g., for safety reasons).

Sensation authoring tools may include a library of effects from which the designer may simply choose a desired effect. These effects may be combined and blended with one another or with custom effects of the designer's own creation. This may allow for tremendous creative freedom while maintaining the stimuli delivered to remain within strict safety limits. Stimulation parameters such as, but not limited to, stimulation beam intensities or output power, pulse widths, pulse frequencies, duty cycles, waveforms, wavelengths, sensation point spacing, number and configuration and spacing of sub-points, beam diameter and profile, X-Y positioning, and spatial offsets will be recorded for each stimulation so that the system may track tissue exposure for safety and analysis.

The underlying program that determines effective stimulation and safety relies on physiologic testing data and predictive models for tissue response. The testing data, which may be based on an individual's calibration data and population testing data, shows where sensation thresholds are and how other sensory experiences may be created by manipulating the various stimulation parameters. Safety limits may be imposed based on testing data, but will also be checked by a predictive tissue damage algorithm. Such a predictive algorithm may be based on methods such as, but not limited to, finite element methods or finite difference models and based on human and animal tissue testing. The predictive algorithm may run through the entire stimulation protocol and analyze each stimulation point, whether sub-point or a complete sensation point, to determine safety before proceeding. There may also be an option for the designer/user to provide feedback to the software and thus modify the resultant stimulation output.

Figure 13:
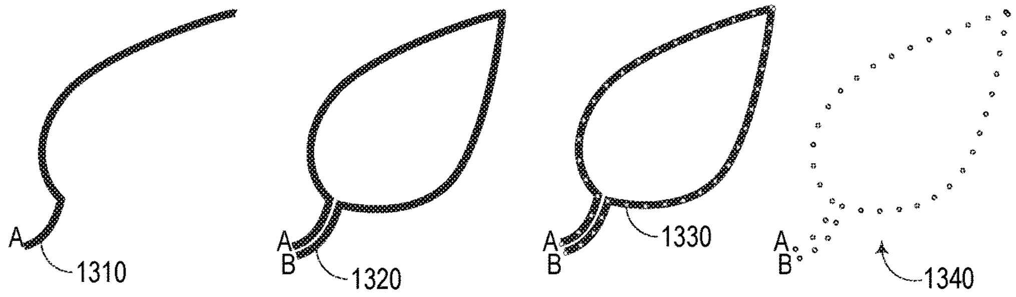
FIG. 13 shows a progression of shape creation within a sensation authoring tool consistent with embodiments of the present disclosure.

FIG. 13 shows a progression of shape creation within a sensation authoring tool consistent with embodiments of the present disclosure. In one embodiment a vector graphics type interface allows for the creation of basic shapes. An initial line shape 1310 is created and sculpted to the desired shape. Later a second line shape 1320 is added to complete the outlined shape of a leaf. In this embodiment of the authoring tool, the user is allowed to see two additional views. Based on desired characteristics of these lines, the authoring software places stimulation points 1330 along the lines. An additional view 1340 shows the entire shape made up of only the stimulation points. The different lines are marked A and B in order to differentiate them. The user may independently set start times, speed of stimulation, and tactile characteristics for each line.

Figure 14:
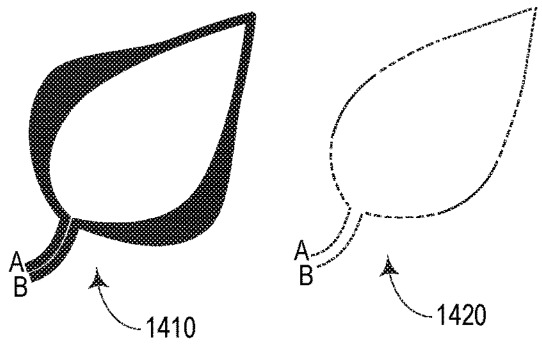
FIG. 14 shows stimulation profiles of a leaf that varies along the perimeter consistent with embodiments of the present disclosure.

FIG. 14 shows stimulation profiles 1410, 1420 of a leaf that varies along the perimeter consistent with embodiments of the present disclosure. In stimulation profile 1410, the width of the line may correspond to a stimulation parameter, such as intensity of the stimulation. In other embodiments, the width of the line may represent other characteristics such as sensation intensity, dullness/sharpness, sweep speed and acceleration, line thickness, temperature sensation, contrast to surrounding sensation, or texture. Each of these characteristics may be considered separately and used, as in a vector graphics program, in a different layer. Such sensation characteristics layers are considered by the underlying algorithm and combined into a single set of stimulation instructions to the system. Calculations and checks such as expected temperature profiles and dose limits will also be performed to ensure safe levels.

In stimulation profile 1420, the intensity of stimulation may be represented by broken lines. A solid line may represent a maximum intensity, while a dashed line may represent a reduced intensity. Still further, a dotted line may represent a further reduced intensity of the sensation characteristics shown in 1410.

In other embodiments, sensation authoring tool may allow a designer to generate a visual representation of a stimulation profile that may be displayed to a user while a tactile stimulation is generated. In various embodiments, the visual representation may employ grayscale and color gradients. The different visual representations each allow for the designer to modify a characteristic of the sensation.

Figure 15:
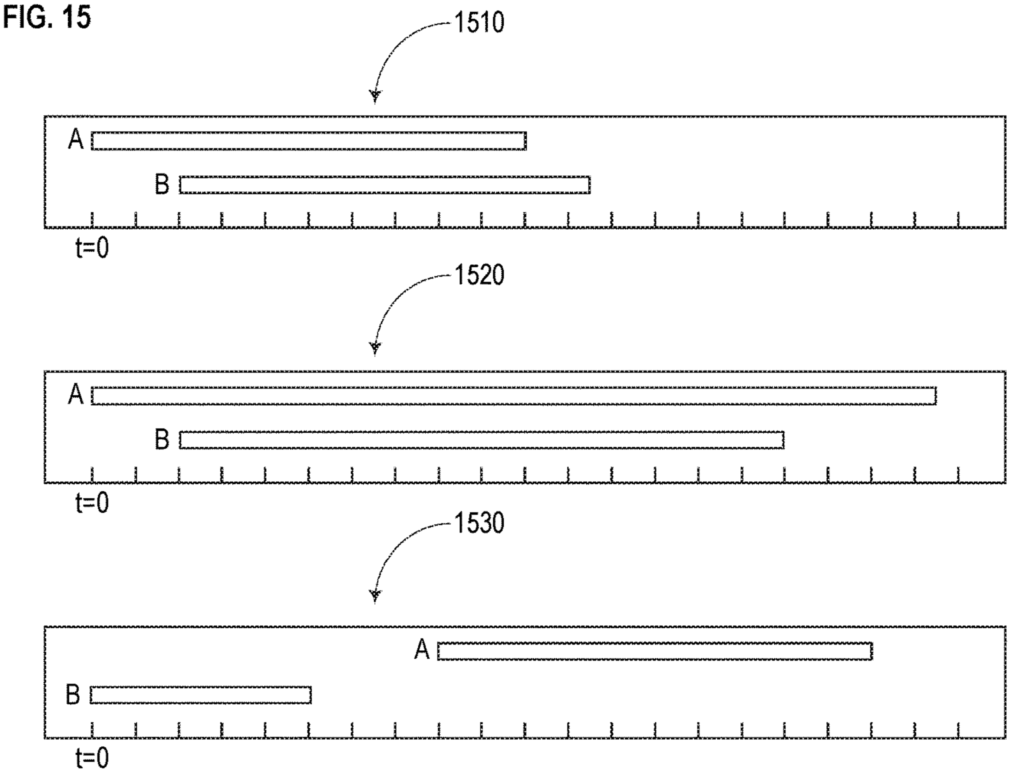
FIG. 15 shows an interface for adjusting the temporal relationships between the various components of an authored shape consistent with embodiments of the present disclosure.

FIG. 15 shows an interface for adjusting the temporal relationships between the various components of an authored shape consistent with embodiments of the present disclosure. Using the same curves A and B, which are illustrated in FIG. 13, the lengths, speeds, and accelerations of the stimulation profile may result in a duration of stimulation for each stimulation element. These relationships may be shown on a single axis graph where the duration of each curve is represented by a bar as seen in 1510, where curve A begins before curve B. In 1520, the duration of both curves has been lengthened, however, now curve A is significantly longer in duration than B so that it begins sooner yet ends later. In 1530, curve B has been shortened in duration and begins first and ends before, and after a pause, curve A is stimulated.

Figure 16:
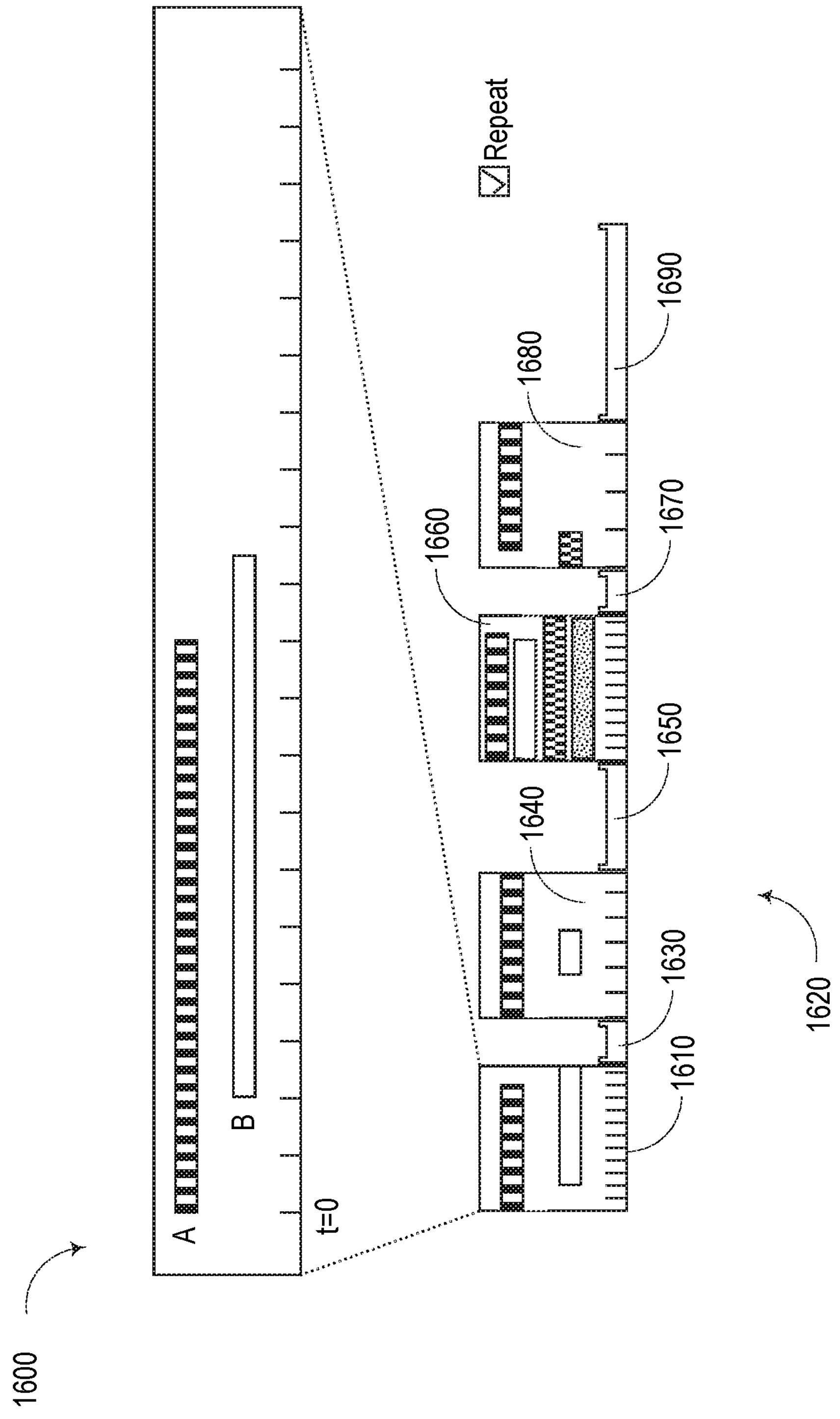
FIG. 16 illustrates an exemplary display of a temporal relationship tool including a plurality of sensations over a period of time consistent with embodiments of the present disclosure.

FIG. 16 illustrates an exemplary display 1600 of a temporal relationship tool including a plurality of sensations over a period of time consistent with embodiments of the present disclosure. Concatenating sensations into a script may be useful for creating a plurality of sensations. Any of such sensations may be used as frames within a script. Frame 1610 may be the first frame of the illustrated script 1620. In the illustrated embodiment, there is some time (i.e., time periods 1630, 1650, and 1670) between each of a plurality of frames 1610, 1640, 1660 and 1680. In various embodiments, the time periods separating frames may be customizable. Each of the frames may have similar or different sensations. Each frame may be of different durations. The final time element 1690 is the time before any other sensation may be delivered. The sensations may be repeated or not. The scripts may be limited by considerations for safety and system performance.

Figure 17:
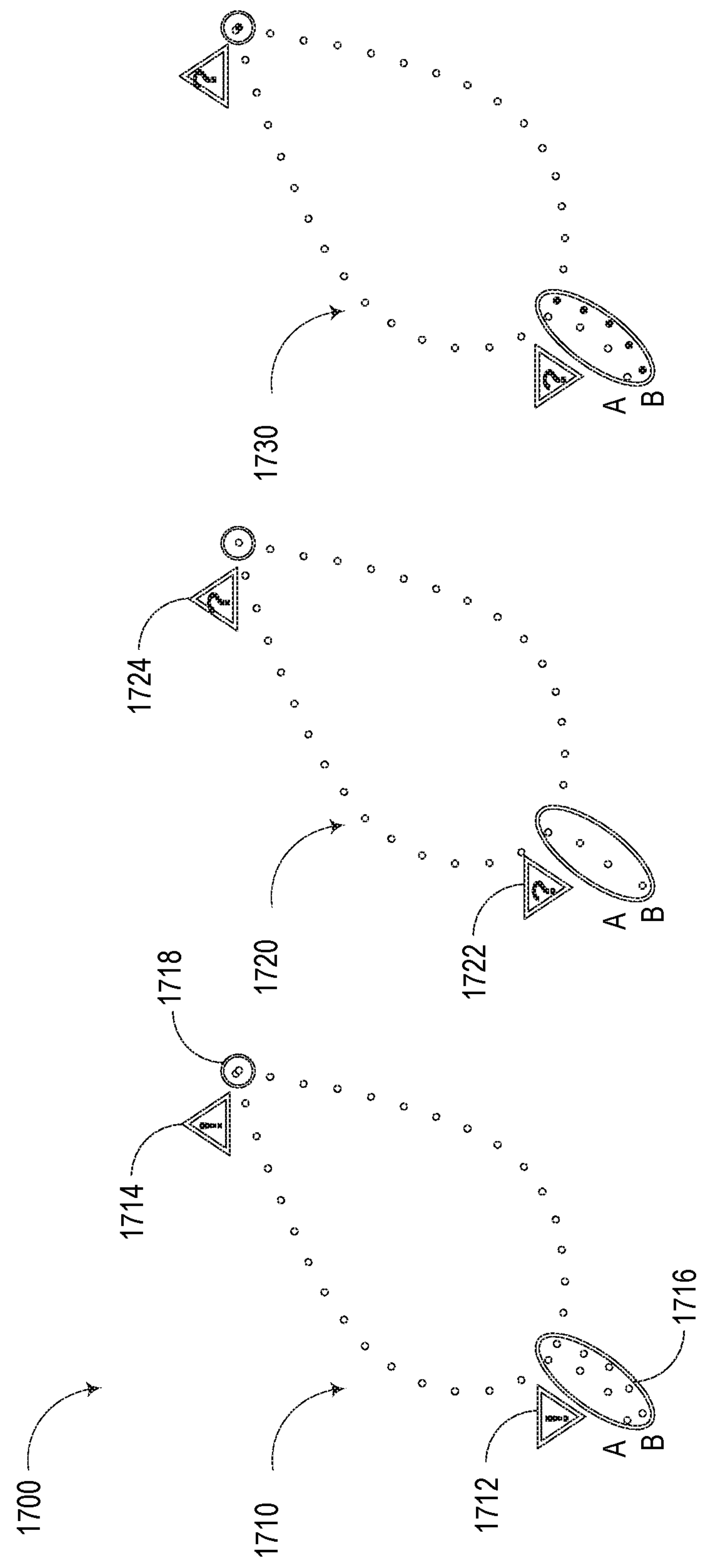
FIG. 17 illustrates an exemplary display of a tool configured to test the possible interactions between stimulation points and/or sub-points and identify potentially problematic areas consistent with embodiments of the present disclosure.

FIG. 17 illustrates an exemplary display 1700 of a tool configured to test the possible interactions between stimulation points and/or sub-points and identify potentially problematic areas consistent with embodiments of the present disclosure. In the illustrated embodiment, illustration 1710 identifies two potentially problematic areas shown within double circles 1716 and 1718. The problematic areas are marked by icons 1712 and 1714.

Illustrations 1720 and 1730 may represent possible resolutions to the issues identified in illustration 1710. In illustration 1720, icons 1722 and 1724 may mark where a stimulation profile has been modified and may prompt a user to review the proposed modifications. As may be observed by comparing illustrations 1710 and 1720, the resolution shown in illustration 1720 may be removing one set of points that are too close to adjacent points. In contrast, illustration 1730 may represent a solution that diminishes the intensity of the points as shown by filled circles. Either or both of these solutions, as well as many others, may be presented to the designer as options to keep the user safe and achieve the desired tactile sensation. The designer may test multiple solutions to determine which produces the best sensory result.

Limits on energy deposition in the stimulated tissue may be protective against undesired painful sensations and tissue damage. Determination of such limits may be done in several ways including, but not limited to, experimentation and computer modeling. In an embodiment where limits are determined by a computer model, the energy within the tissue may be considered as a heat transfer phenomenon. Initially, upon tissue stimulation, there is a small concentrated area of higher temperature. Heat is transferred to the surrounding tissue. This continues until at some point the heat has dissipated to the point that the tissue has returned to its baseline temperature. An understanding of the spatial and temporal characteristics of this temperature change may allow for a model to accurately predict the resultant heat from the interaction of multiple stimulations.

Figure 18A:
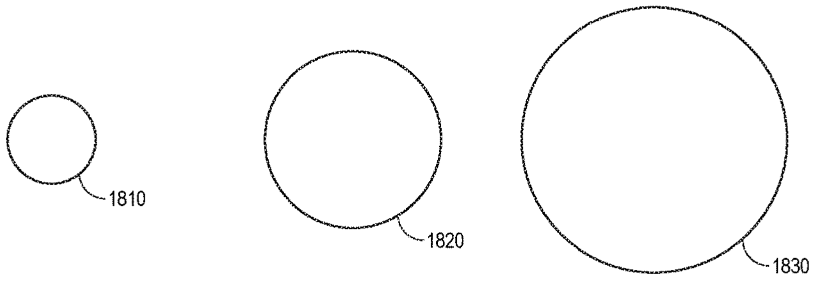
FIG. 18A shows a representation of a spatial boundary where temperature elevation has occurred as a result of deposition of energy over time by an optical stimulation system consistent with embodiments of the present disclosure.
Figure 18B:
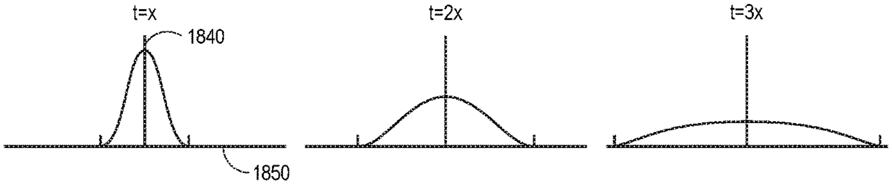
FIG. 18B shows is a series of temperature profiles corresponding to the spatial boundaries illustrated in FIG. 18A consistent with embodiments of the present disclosure.

FIG. 18A shows a representation of a spatial boundary where temperature elevation has occurred as a result of deposition of energy over time by an optical stimulation system consistent with embodiments of the present disclosure. FIG. 18B shows is a series of temperature profiles corresponding to the spatial boundaries illustrated in FIG. 18A consistent with embodiments of the present disclosure. The vertical line 1840 shows the temperature increase and the horizontal line 1850 shows the distance from the center point of the circle. All profiles may represent a measurement through the center of the circle. At the first time point of t=x where the circle 1810 is the smallest it can be seen that the peak temperature rise is high. At t=2x, heat is dissipated over a larger area while the peak temperature in the center can still be significantly high. At t=3x, the circle 1830 is considerably larger with increased spread and heat dissipation and the peak temperature at the center has become less pronounced.

Figure 18C:
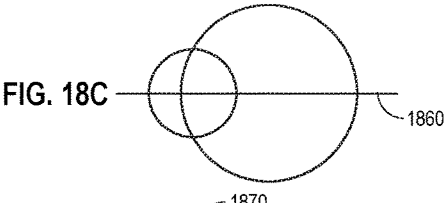
FIG. 18C shows an overlap of two fields of increased temperature that may have resulted from two closely spaced points in rapid succession.
Figure 18D:
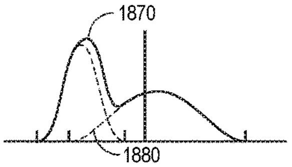
FIG. 18D illustrates the temperature along the line illustrated in FIG. 18C.

FIG. 18C shows an overlap of two fields of increased temperature that may have resulted from two closely spaced points in rapid succession. The line 1860 represents a line running through the center point of the two circles. FIG. 18D illustrates the temperature along the line 1860 illustrated in FIG. 18C. The tissue temperature is shown by the curve 1870, while the dashed lines represent what the temperature levels of each of the spots would be individually (i.e., if the overlap between the stimulation had not occurred). Toward the edges of the temperature profile the temperature is identical to that of the individual spots. However, there is an additive effect on the energy where the spots overlap and the curve 1870 is higher in the overlapping area. An overlap of many spots, even those separated temporally, may result in temperature levels that are unacceptable. Sensation authoring tools consist with the present disclosure may disallow and or modify such a stimulation pattern so that any unacceptable rise in temperature is avoided.

Figure 19B:
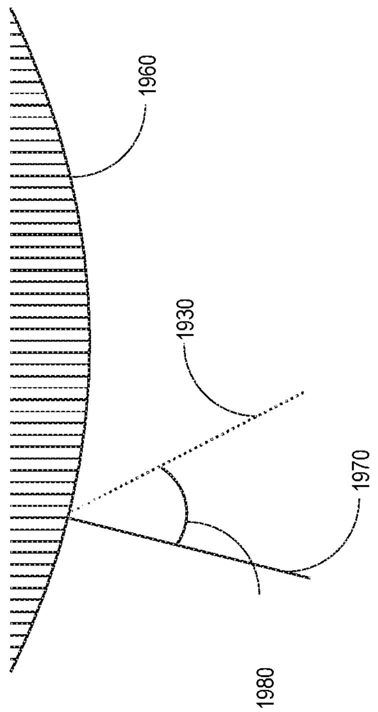
FIG. 19B shows the stimulating beam of FIG. 19A incident at its original angle onto a tissue that has a curved surface.
Figure 19A:
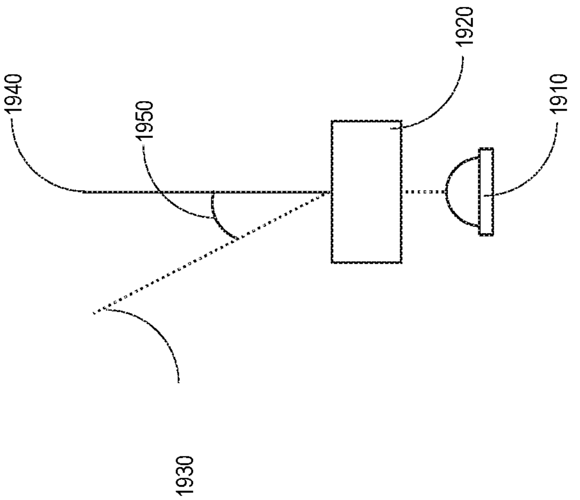
FIG. 19A illustrates a system with a single light source directing its beam through a beam steering device that is capable of redirecting that beam through a certain angle.

FIG. 19A illustrates a system with a single light source 1910 directing its beam 1930 through a beam steering device 1920 that is capable of redirecting that beam through a certain angle 1950. The unmodified beam path is shown by the solid line 1940, while the beam is deflected by the scanner at an angle 1950. In certain embodiments, the light source 1910 may be used to scan a large tissue area. As a result of wide coverage by the single fixed source directed 1910 by some beam steering device 1920, the angle 1950 of the beam can be significantly large at the outer regions of the scanning field. The angle of incidence can further be increased depending on the contour of the tissue. Such issues may also be present in systems employing multiple light sources such that the beams need to be directed in order to appropriately stimulate the tissue.

FIG. 19B shows the stimulating beam 1930 of FIG. 19A incident at its original angle onto a tissue 1960 that has a curved surface. Line 1980 is a normal line extending from the surface of the tissue and the resultant angle of incidence is shown by 1930. The angle of the scanner and the relative angle resultant from the tissue curvature both contribute to the final angle of incidence which may be tracked by the system and compensated for.

In one embodiment, the tissue is not in contact with a touch surface and the curvature of the tissue adds to the angle of incidence of the incident beam originating from a distant light source. The large angle of incidence may result in increased reflection, a larger incident spot size, and a possible reduction in the degree of tissue penetration. In one embodiment, as the circular beam moves from the center to the outer regions of the scanning field, the incident spot geometry and size enlarges. This may result in a decrease in energy density over the spot size and, therefore, reduced intensity and/or modified quality of the tactile sensation elicited. To compensate and obtain the desired level and quality of sensation throughout the entire stimulation field, the control software may deliver a different set of stimulation parameters at those outer locations, adjusting any and all stimulation parameters. In certain embodiments, a higher output power from the light source may be specified at the outer radial positions of the scanning field. In other embodiments, a longer pulse can be delivered. This increase or decrease in energy can be accomplished by adjusting laser parameters including, but not limited to, output power, pulse width, pulse frequency, duty cycle, and waveform based on angle of incidence.

The tactile object stimulation patterning does not necessarily have to geometrically align exactly with the shape of the object being represented. In one embodiment, to gain the attention of the user and orient them to a tactile object that will be subsequently conveyed, a stimulatory leader pattern may be used. This may be particularly useful when a tactile stimulation pattern is not anticipated by the user to ensure tactile details are not missed due to inattention. In one embodiment, this stimulatory leader feature may be, but is not limited to, an array of stimulation points oriented along a straight line which as an extension of the tactile object pattern. In one embodiment, a pre-designed tactile incitement pattern may be delivered to the palms of the driver on a steering wheel to gain the attention of the driver before sending a specific pattern or a series of patterns indicating that a desired turn is upcoming. The stimulatory leader feature or tactile incitement pattern can be an array of sensation points organized in different patterns such as, but not limited to, straight lines, curves, dynamic and static shapes, etc.

Figure 20A:
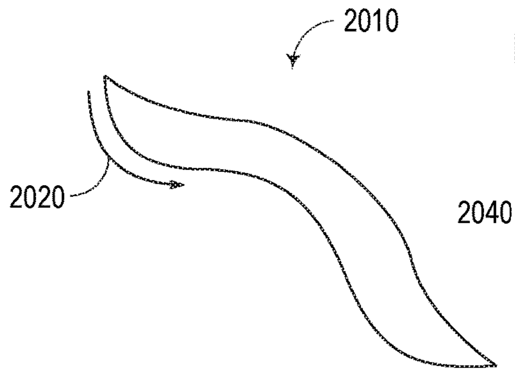
FIG. 20A shows the outline of a shape consisting of two lines of sensation 2010 starting from the top left and moving simultaneously to the bottom right shown by the direction arrow consistent with embodiments of the present disclosure.

FIG. 20A shows the outline of a shape 2010 consisting of two lines of sensation starting from the top left and moving simultaneously to the bottom right shown by the direction arrow 2020 consistent with embodiments of the present disclosure. It is possible, due to a number of factors including inattention, that the beginning portion of the shape 2010 is not perceived by a user.

Figure 20B:
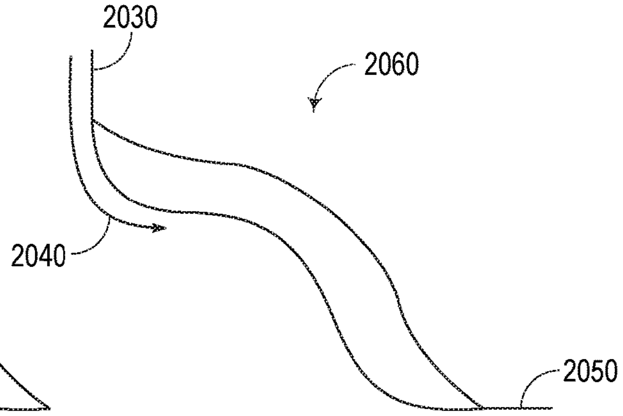
FIG. 20B illustrates a shape in which a leader line extending beyond the beginning point and leading straight into the shape.

FIG. 20B illustrates a shape 2060 in which a leader line 2030 extending beyond the beginning point and leading straight into the shape. The leader line is stimulated first and followed by the remaining shape as shown by direction arrow 2040. FIG. 20B also illustrates a form of stimulatory trailing feature, in this embodiment, a stimulatory trailer line 2050 similar to a leader line at the back end of a sensation. This may be used to emphasize and/or complete the tactile details at the end portion of a shape or object. The stimulatory leader/trailer feature may not necessarily use the same stimulation settings as the tactile object pattern.

Figure 21B:
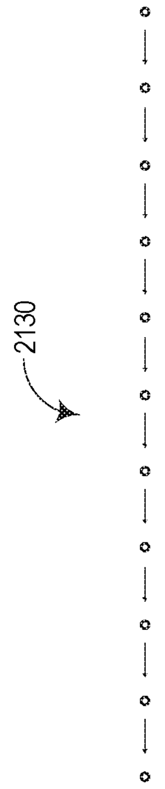
FIG. 21B shows a series of stimulation points following one after another in a line from right to left indicating that the driver should make the upcoming left-hand turn.
Figure 21A:
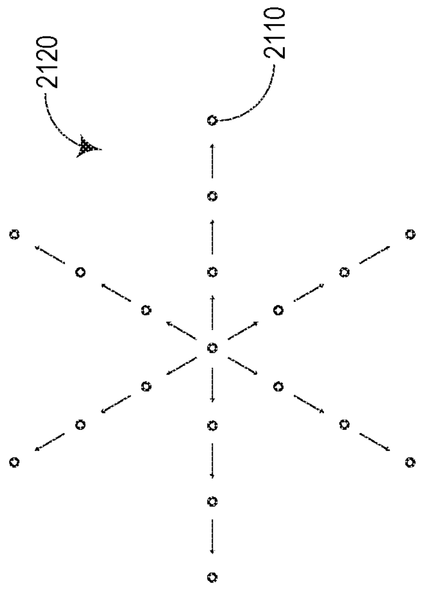
FIG. 21A illustrates an attention sequence for use in tactile automobile navigation instructions consistent with embodiments of the present disclosure.

FIG. 21A illustrates an attention sequence 2120 for use in tactile automobile navigation instructions consistent with embodiments of the present disclosure. Here the open circles 2110 represent sensation point stimuli. Attention sequence 2120 is a radially increasing pattern that starts off with a single central sensation point, the next round of sensation is the next larger set of 6 stimulation points and so on until finally the largest diameter set of points is stimulated. This non-directional sensation serves to alert the driver that a directional indicator will soon be delivered. Such attention signals may be delivered for any number of applications as means of alerting the user prior to delivering information.

FIG. 21B shows a series of stimulation points 2130 following one after another in a line from right to left indicating that the driver should make the upcoming left-hand turn. Many other shapes may also be used for both the attention and indication sequences.

Tactile patterns may be particularly effective in situations such as, but not limited to, where information is outside the visual field of view of the user, is too small to visually resolve, or the information is not auditorily detectable (such as, but not limited to, a noisy environment, the user is wearing noise silencing equipment, frequency is too high or too low to be auditorily detectable by the ear, or the environment the user is working in requires absolute silence). In one embodiment, a designer may want to convey the movement of a worm hiding in a pile of dirt when a picture of someone's hand holding dirt is visually displayed. A stimulatory pattern can be delivered to the intended recipient such that the recipient feels something moving on their palm even though the worm is not seen. In another embodiment during an important meeting the intended recipient needs to be notified silently and discreetly of an important message or call without distracting others at the meeting. A stimulatory tactile incitement pattern may be delivered to gain the attention of the intended recipient and then follow-on information conveyed. In another embodiment, an oncoming vehicle is about to collide with the user's vehicle outside the field of view of the driver. The automobile control system delivers a tactile incitement pattern through the steering wheel to the palms of the driver's hands that, along with other warning indicators, may help more immediately gain the driver's attention. This can be followed by a series of tactile-based patterns indicating where the threat is coming from or how to take evasive action.

Tactile information and delivery can also be triggered by external devices and programs. In one embodiment, tactile incitement and tactile object information can be delivered to the user based on a trigger signal received from an eye-tracking system. Recognition of what a user touches may be greatly improved when the attention of that user is focused on what is being felt. Eye tracking may serve as an effective surrogate of attention. For instance, if the user is gazing at a particular location on a visual display where content such as, but not limited to, text, image, or video is being shown, pre-designed tactile information associated with that content may be delivered to the user. In one example, a user reads text on a visual display and comes across the phrase "running shoes," the eye-tracking system sends a signal to the tactile stimulator which delivers a correlated sensation to the reader. This tactile object pattern may be, but is not limited to, the logo of a shoe manufacturer that can then be delivered to the user as a form of advertisement. In another example, a reader sees the picture of a cat and a tactile representation of cat's fur is delivered to the reader. Inputs from other systems and programs may be integrated with the tactile delivery system to ensure the appropriate and intended tactile information is delivered.

Figure 22:
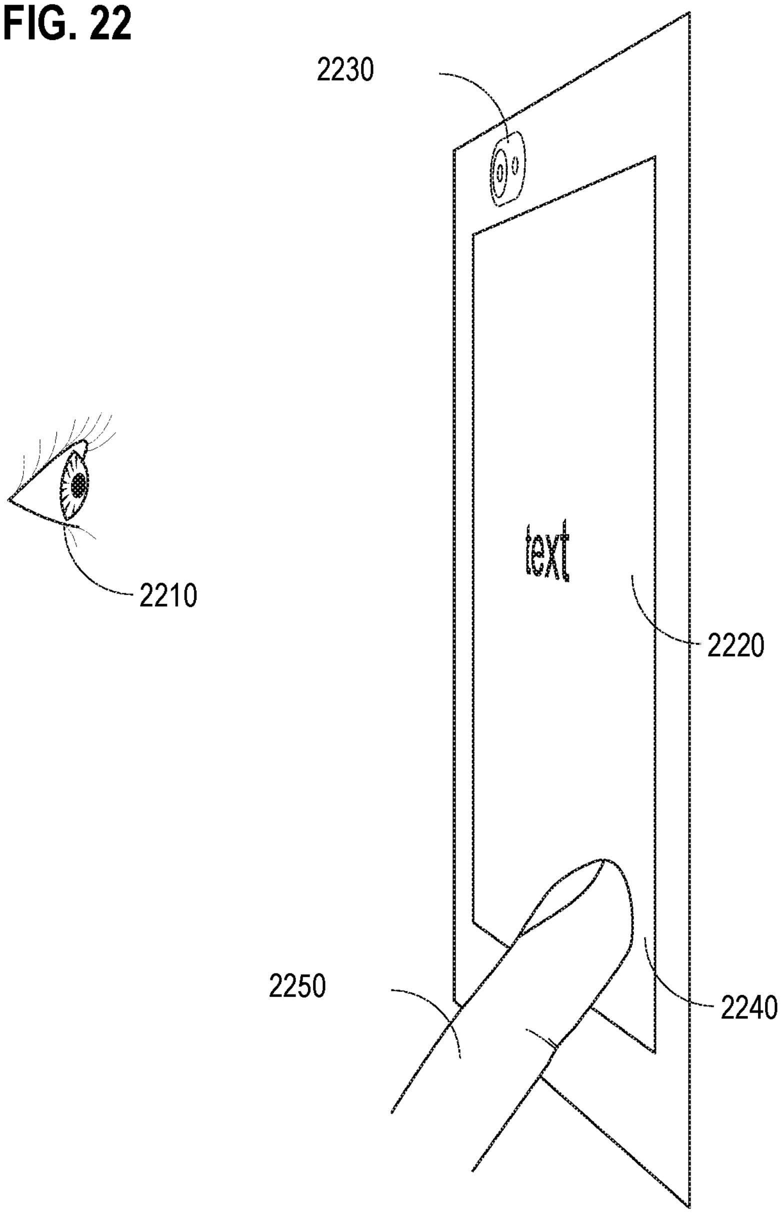
FIG. 22 represents one possible embodiment of an integrated eye tracking system consistent with embodiments of the present disclosure.

FIG. 22 represents one possible embodiment of an integrated eye tracking system consistent with embodiments of the present disclosure. Here the viewer 2210 is reading text on a screen 2220. The eye tracking camera 2230 gives the position on the screen where the user's attention is likely to be. In a separate area on the screen 2240 designated to be the stimulation area the user's finger is stimulated to feel the sensation associated with the text.

To minimize electromagnetic exposure while still conveying tactilely important information to the user, stimulating only an outline of important features may be sufficient. Consider a hole in the center of a flat plate. In certain embodiments, rather than deliver stimulation to represent the interior of the solid object, stimulating only the prominent features of the object may be sufficient. In delivering stimulation to represent only certain features, the attention of the user may be focused on tactilely important features that are meant to be perceived and retained. Minimizing electromagnetic exposure may also serve to reduce system power consumption. It also can reduce physiologic adaptation to the tactile stimulus. This may also aid in remaining below exposure limits.

Figure 23:
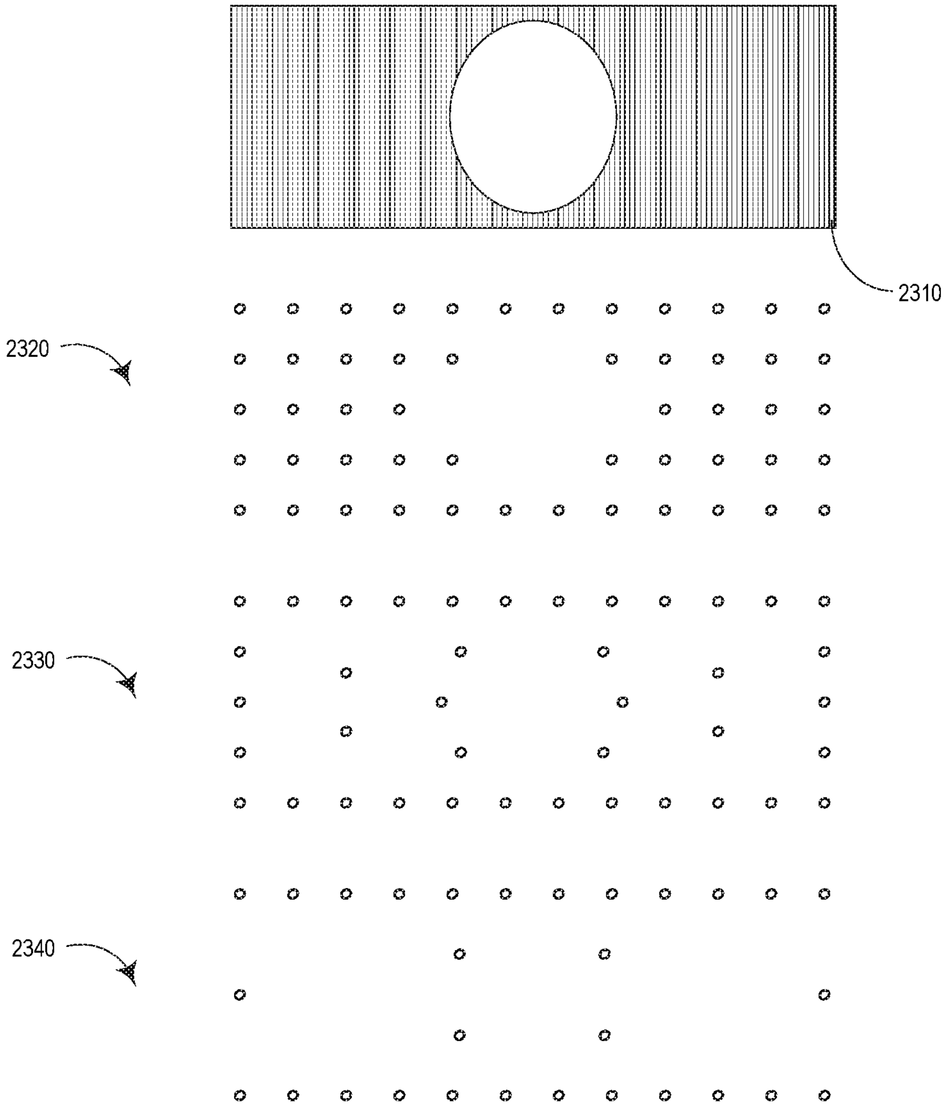
FIG. 23 illustrates a plurality of representations of an object with a smooth surface and a circular void in the center to be represented by the tactile stimulation system consistent with embodiments of the present disclosure.

FIG. 23 illustrates a plurality of representations 2320, 2330, and 2340 of an object 2310 with a smooth surface and a circular void in the center to be represented by the tactile stimulation system consistent with embodiments of the present disclosure. Representation 2320 illustrates representation that utilizes a plurality of distinct points of stimulation. The distinct points of stimulation may be a viable method of representing such an object 2310. Further, the object 2310 may also be reasonably represented by outlining all the edges and stimulating fewer interior points, as illustrated in representation 2320. Representation 2340 may also be perceived by a user as representing object 2310 using even fewer stimulation points to represent only the edges of the surface. Representations 2320, 2330, and 2340 are meant to be illustrative and not an exhaustive set of possible examples of representations of object 2310.

It may be useful to employ visual indicators where tactile object patterns may be felt. In one embodiment, the visual highlighting can be overlaid on objects such as, but not limited to, text, images, and videos on a display. As an example, a campfire on a display is highlighted by a visible circular dashed line indicating a tactile experience is available to be felt. In one embodiment, a reader touches the display over the campfire and a heating sensation is delivered. In other embodiments, other tissues are stimulated not through the visual display but another off-display tactile stimulator system.

Figure 24:
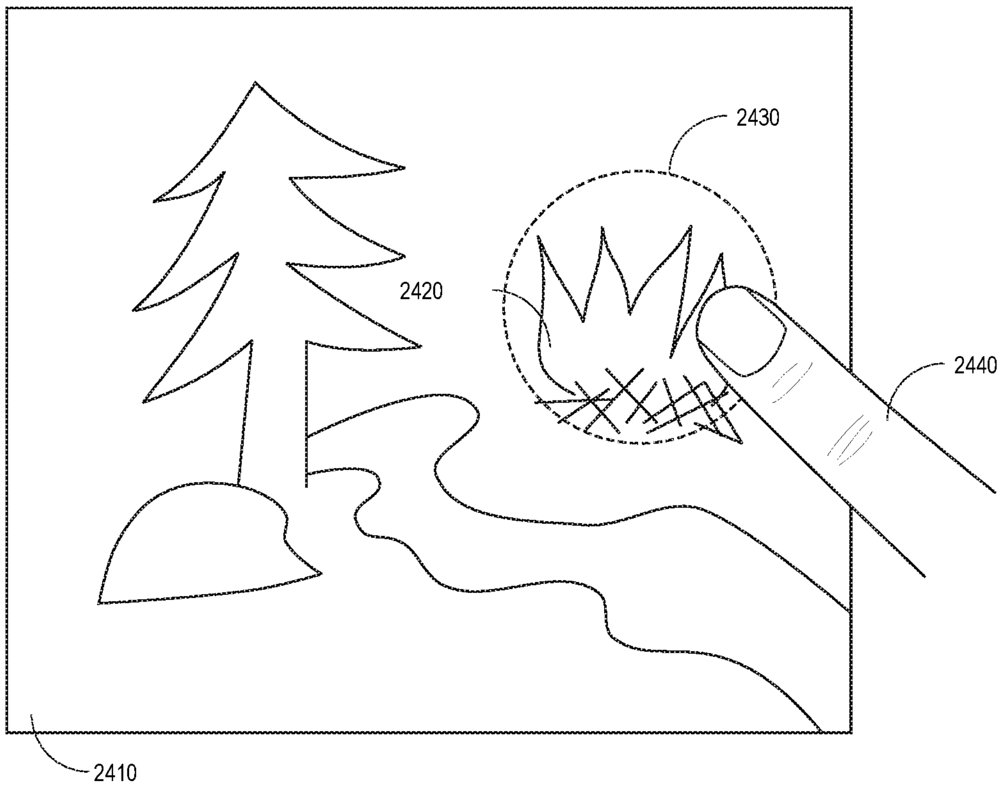
FIG. 24 shows a display with a campfire, in which the heat of the fire may be felt consistent with embodiments of the present disclosure.

FIG. 24 shows a display 2410 with a campfire, in which the heat of the fire 2420 may be felt consistent with embodiments of the present disclosure. A visual cue 2430 may be provided and with which the user may interact on a portion of the display or image to receive a tactile stimulation. For example, when the finger 2440 touches the display within the dashed circle a sensation of heat may be generated using an optical stimulation system.

Figure 25A:
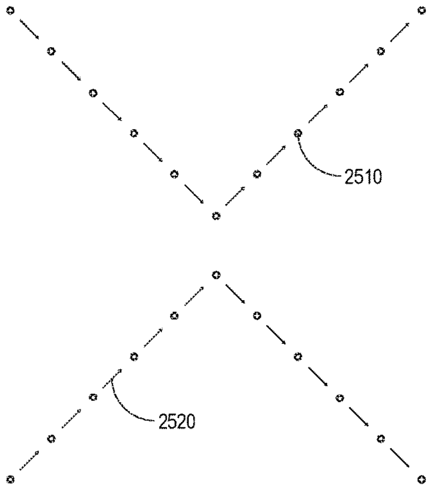
FIG. 25A illustrates a stimulation pattern that may create a variable heating sensation consistent with embodiments of the present disclosure.

FIG. 25A illustrates a stimulation pattern that may create a variable heating sensation consistent with embodiments of the present disclosure. As illustrated, the stimulation pattern may utilize converging and diverging line patterns. The plurality of circles 2510 may be distinct points of stimulation and the arrows 2520 may represent a directionality of the stimulation. The convergence of array of lines may cause an increase in heating sensation, which is maximized around where the two lines are closest. After this convergence, there may be a perceived decrease in the intensity of heat as the lines diverge.

Figure 25B:
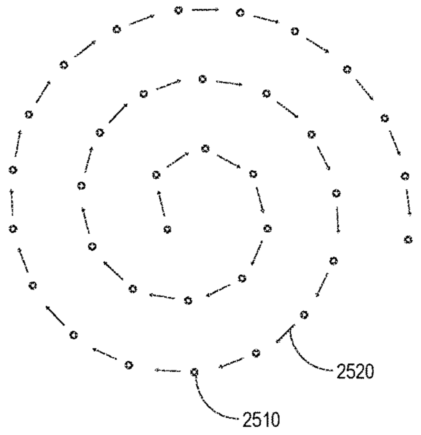
FIG. 25B illustrates another stimulation pattern that may create a variable heating sensation consistent with embodiments of the present disclosure.

FIG. 25B illustrates another stimulation pattern that may create a variable heating sensation consistent with embodiments of the present disclosure. As illustrated, the stimulation pattern comprises a spiral pattern. Again, the plurality of circles 2510 may be distinct points of stimulation and the arrows 2520 may represent a directionality of the stimulation. Any and all stimulation variables may be modulated to create the desired sensations.

Figure 26:
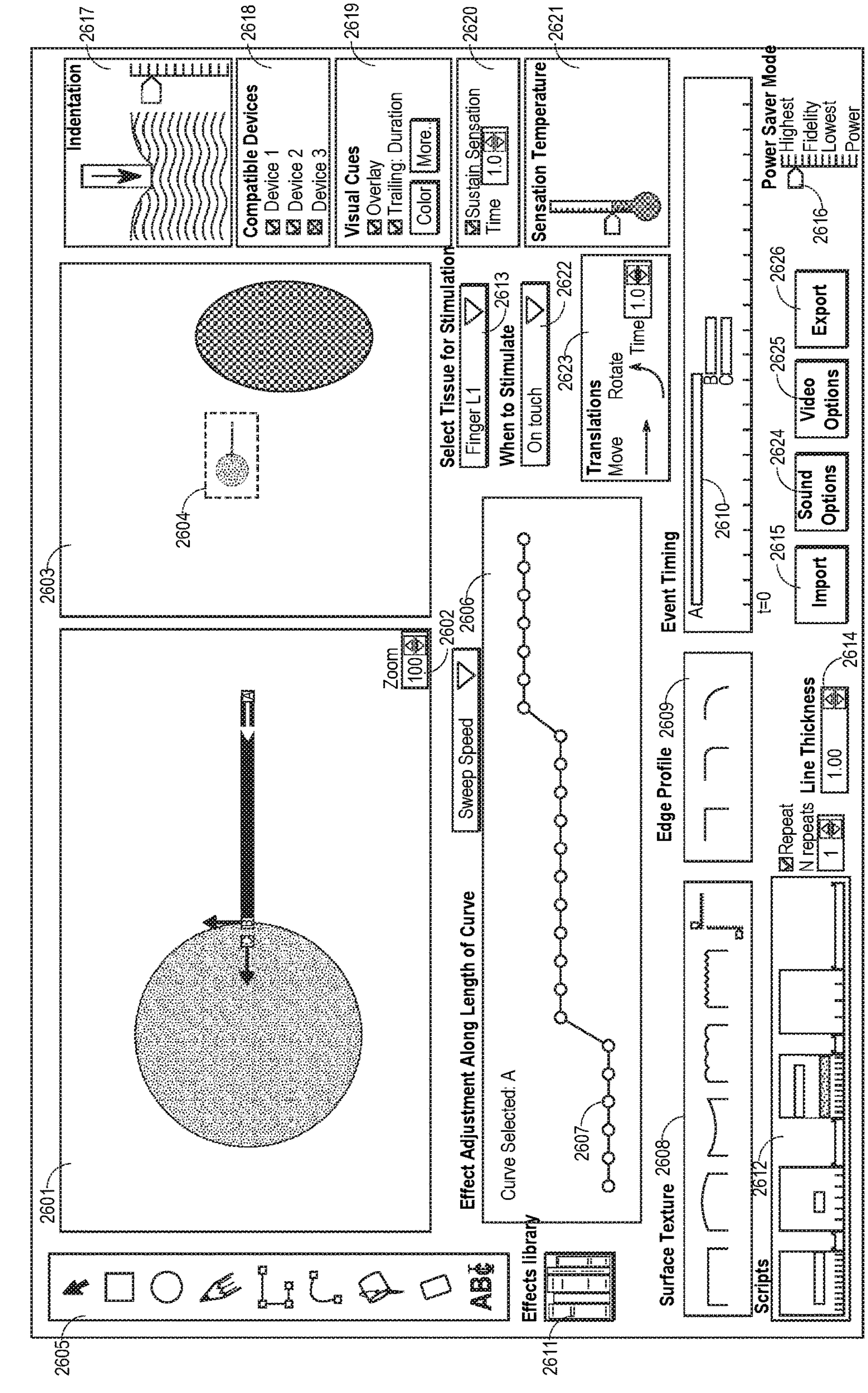
FIG. 26 shows one embodiment of a tactile stimulation design software consistent with embodiments of the present disclosure.

FIG. 26 shows one embodiment of a tactile stimulation design software 2600 consistent with embodiments of the present disclosure. There may be multiple embodiments with access to different tactile sensations depending on the intended devices and the qualifications of the designer. The main portion of the window is the drawing area 2601 where new sensations may be created and combined. As shown in the illustrated embodiment, area 2601 is a small portion of the stimulation field. This area may be dynamically scaled by the zoom 2602 to allow for creation of shapes contained within the tissue area to be stimulated and those much larger than the tissue area that still fit within the stimulation field. The field view area 2603 shows a snapshot of the entire stimulation field in which the sensation may be created. In some instances, tactile sensations may be linked to a physical location within the stimulation field while others may be mobile and depend on an action, gesture, or may be linked to a specific tissue location. This area 2603 may show the user the perspective of their various sensations in spatial and temporal relationships. Both 2601 and 2603 may be used to edit the tactile sensations and movement thereof and display the results. The dashed line 2604 represents the field shown in 2601 and its placement within the larger stimulation field. The large ovoid object shown is an example of an object larger than the tissue stimulation area, any portion of which may be explored and the corresponding tactile features delivered to the tissue.

Selection, creation and editing tools are shown in box 2605. These tools may allow the designer to select a curve or surface area, create various shapes, draw curves in freehand, create straight lines between nodes, create curve lines between nodes, fill enclosed areas with a surface type, erase elements and manipulate labels. These, as well as other possible tools, may allow the designer to create a near infinite number of different tactile effects.

As each curve or area is selected any number of different characteristics may be edited. In window 2601 there are three sensation shapes labelled A, B and C. Each of these shapes may be individually selected and its various parameters edited. Curve A is shown starting from the right side of the stimulation field with a directional arrow indicating that it will be stimulated from right to left. The start nodes for each of the elements in this window are shown as boxes containing the letter label for each element. The arrows associated with the start nodes may be adjustable such that the arrow indicates the direction of stimulation. In system embodiments where a single stimulation source is employed these directional indicators become necessary as there can be only a single stimulation delivered at any given time. In a multisource system embodiment the directionality may become unnecessary as multiple stimulations may be simultaneously delivered. In certain situations, the direction of stimulation may convey the intended message or experience to the recipient.

The effect box 2606 may show any number of effects for curves and/or areas including, but not limited to, sweep speed, surface texture, edge profile, translation speed, rotation speed, magnification speed, perceived indentation, temperature, and line thickness. Each node along the curve 2607 may be individually adjusted in a manner similar to an audio equalizer. The ability to adjust such characteristics at various locations all along the curve may allow for a multitude of different sensations such as simple or complex, highly realistic or novel sensations to be created. The current selection shown in box 2606 shows that the sweep speed is selected for curve A. The initial sweep speed is slower, increasing partway through, and then increasing further toward the end of the curve.

Perceived indentation may be controlled through box 2617 and modulated along the curve through box 2606. As the incident light on the tissue does not actually deform and indent the tissue as most mechanical stimuli would, the sensation is merely induced. Minimal mechanical indentations involve smaller areas of tissue and deeper indentations deform larger areas of tissue. These changes may be accounted for by the underlying program out of reach of the designer. However, these changes may also affect other parameters and their available limits. Such changes may be made automatically. The designer may be notified that these have been changed to meet the requirements. Such automatic changes may be made for any of the parameters to accommodate a certain requested sensation.

Surface texture is one characteristic that may be modified. Box 2608 shows a possible interface for choosing and modifying surface characteristics. Within the box a number of possible surfaces are shown. The possible surfaces include, but are not limited to, flat, convex, concave, smooth, bumpy, and rough. At the right side of the box are a set of sliders that may allow the user to adjust the characteristics of these surfaces. For example, the diameter and height of the bumps or other characteristics may be adjusted by these sliders. The effects may be used alone or in combination with each other.

Edge or line profile shown in box 2609 allows the user to choose the type of sensation to include at the edge of an object. Such edges range from a very sharp edge to a gradual rounded edge. Three of a nearly infinite number of possibilities are shown. Another parameter interconnected with this is line thickness which may be adjusted both manually, as shown by 2614, and/or automatically to accommodate other parameters.

Object temperature may be adjusted within a certain range from box 2621. Some system embodiments will be able to accommodate only increasing the temperature of the object above that of the initial tissue temperature. Other system embodiments may also employ an active cooling device. The design software will take these into account and automatically adjust the available temperature range accordingly.

Event timing, as described in another figure, is shown as part of the design software as box 2610. In this example the curve A is stimulated first. The duration of this sweep comes from the adjustments made in box 2606 and are reflected in box 2610 by the length of the various bars. Elements B and C are stimulated much more quickly than A and are stimulated simultaneously immediately after A finishes. In some embodiments this box will be only an informational window, while in others it may act as a control and dynamically change the values in other areas which may be interconnected. Box 2610 may also be synchronized to video time stamps. In one embodiment, the video is visually displayed along with the tactile stimuli allowing for coordination of the two modalities. This may be useful for the designer to synchronize stimulation events with sequences or frames in the video. Similarly, audio may be displayed in such a way to allow such alignment.

Box 2612 shows the script area, also described in a separate figure. The individual frames of such scripts may be created and arranged here manually, or may be automatically populated. An example of such automatic population may be the use of the option to sustain a sensation as in box 2620. When this option is ticked and the duration of sustaining selected, the script may be automatically populated with a series of frames such that the desired sensation remains constant. Another example of automatically populating the script is when a translation is requested. There may be many more instances of automatic script population. Box 2623 shows two of the possible translations which include move and rotate. There is a duration over which these translations may occur. When such is requested, a script may be automatically created to perform such actions over the desired time. A non-exhaustive list of options that may be included in the translations is: invert, appear, disappear, grow, shrink, radiate, dissolve, split, and join.

The designer may specify is when and what to stimulate. Boxes 2613 and 2622 deal with these parameters. For example, the designer may want a certain sensation delivered only to one portion of the hand and no other. In such a case the designer may specify that only the finger L1 (thumb on left hand) is to be stimulated for this particular sensation. The designer may also specify that there is no preference for a location so that any and all appropriate tissue locations may be stimulated. Appropriate tissue is determined in the system embodiment. There may be an embodiment that deals only with finger tips while others may be capable of stimulating other tissues capable of discerning tactile sensations. Each of the systems' limitations may be accounted for in the options available in the design software. Box 2613 indicates an option to specify certain actions on which such a sensation may occur. In an embodiment where the stimulation surface is a touch interface such as a tablet computer the designer may indicate that on touching the associated on-screen object the sensation is to be delivered. In a non-contact embodiment the device may stimulate when the tissue moves into a certain position or after completing a certain gesture. The possible actions on which to stimulate may include, but are not limited to, touch, gesture, position, gaze or visual attention, verbal command or preprogrammed sequence.

As mentioned, there may be limitations to the various sensations that are achievable due to the system in various embodiments. Such systems may be limited by a single illumination source that can stimulate only one portion of the tissue at a time sequentially. Another limitation may be the power output of the illumination source such that certain sensation intensities are not achievable by the system. Some systems may be able to accommodate larger fields in which stimulation may occur than others. To communicate to the designer a portion of the program will show a compatibility report for the various systems as seen in box 2618. The designer may select any of the incompatible devices for an explanation detailing the incompatibilities. There may be the option for the program to automatically make the required changes to make the sensations compatible with that particular device. The designer may have the option to review and edit these changes. The resulting output parameters created by the design program may be exported to the individual devices by the export button 2626. Individual calibration data may also be incorporated to modulate the parameters to better create the appropriate sensations.

Box 2619 shows the availability of visual cues with some options. These visual overlays are available to orient the user to the sensations and to augment the sensation to improve its quality. The options shown are trailing duration and color for a one-to-one overlay of the stimulation. There may be many other useful effects that may be utilized and those options may be accessed by selecting the "more" button such as, but not limited to, mapping the entire stimulation, parts thereof, or random visual correlates. Many types of animation may be useful in creating the appropriate visual cue to complement the tactile stimulation.

The design tool allows the designer to import images, video and sounds via the import button 2615. Images may be automatically traced by the design program to create tactile shapes that might be representative of those in the image. The designer may then edit the automatically created shapes for the desired characteristics. The automatic generation may also be skipped so that the image is simply imported. Video and sounds have been found to be useful. Videos and scripts may together create very engaging effects. Sounds and video may be edited by the options buttons 2624 and 2625.

A library of predesigned tactile effects may be accessed through the button 2611. In this library a number of predesigned effects may be simply inserted into the stimulation field, and then further edited by the designer. These effects may be used alone or together. When combined the background processes make the appropriate adjustments to make them compatible, or may return an error message if there are compatibility issues. Elements in the library may include, but are not limited to, shapes, heating sensations, vibration, slip, tactile representations of emotion, and material representation.

The power saver mode shown as 2616 allows a designer to take into account the limitations of some systems in terms of their power supplies. For instance, in system embodiments where the stimulation system is in a mobile device the power supplied by the battery may limit stimulation time. Power saver mode may allow the designer to make choices about how the sensations are changed in order to save power in such systems. The highest fidelity sensations often will be the greatest consumers of power. Power reduction strategies may include, but are not limited to, representing outlines rather than solid shapes, lessening the indentation requested, widening point spacing, changing frequency of stimulation, changes to subpoint arrangements, reducing the size of the stimulation field, or shrinking all objects. At a device level, power minimization strategies for various embodiments may include, but are not limited to, standby modes when not in use and waste heat direction to the tissues effectively lowering tactile sensation thresholds.

As previously mentioned there may be some design tool options available to a select few designers. Painful sensations may be useful for some applications. Embodiments that may utilize painful sensations will have the pain options incorporated into the design tool. Such painful sensations will be limited in their use so that they are safe to the user. It should be noted that pain induction does not necessarily involve tissue damage. Pain is often an early warning system, occurring prior to damage. Embodiments where pain is an optional sensation will be calibrated such that painful sensations do not cause tissue damage.

While specific embodiments and applications of the disclosure have been illustrated and described, the disclosure is not limited to the precise configurations and components disclosed herein. Accordingly, many changes may be made to the details of the above-described embodiments without departing from the underlying principles of this disclosure.

The invention claimed is:

1. A multimodal sensory stimulation system, comprising:
- an optical stimulation system configured to generate an output operable to excite neural tissue and to induce a tactile sensation in a user of an electronic device based upon a tactile application executable on the electronic device and comprising a simulated object;
- an interface component configured to selectively direct the output of the stimulation system onto a target area of skin of the user;
- a controller in communication with the optical stimulation system and the interface component configured to generate a control signal to cause the optical stimulation system to modify one or more characteristics of the output of the stimulation system to induce a tactile representation of the simulated object; and
- a multimodal sensory component in communication with the controller and configured to selectively deliver a multimodal sensory representation of the simulated object.

2. The multimodal sensory stimulation system of claim 1, wherein the multimodal sensory component comprises a display component in communication with the controller and configured to selectively display a visual representation of the simulated object.

3. The multimodal sensory stimulation system of claim 1, wherein the multimodal sensory component comprises a visible laser spot displayed on the target area of skin of the user.

4. The multimodal sensory stimulation system of claim 1, wherein the multimodal sensory component comprises a sound component in communication with the controller and configured to selectively generate an aural representation of the simulated object.

5. The multimodal sensory stimulation system of claim 1, wherein the controller is further configured to adjust an onset and offset of the tactile sensation and the multimodal sensory representation.

6. The multimodal sensory stimulation system of claim 5, wherein the controller is further configured to direct the output of the stimulation system onto a target area of skin of the user before the onset of the visual representation and the aural representation.

7. The multimodal sensory stimulation system of claim 1, wherein the interface component is further configured to direct the output of the stimulation system onto the target area while the target area is in physical contact with the interface component.

8. The multimodal sensory stimulation system of claim 1, wherein the interface component is further configured to direct the output of the stimulation system on the target area while the target area is physically separated from the interface component.

9. The multimodal sensory stimulation system of claim 1, wherein the controller is further configured to diminish an intensity of the optical stimulation system after an initial period of stimulation.

10. The multimodal sensory stimulation system of claim 1, wherein the simulated object is associated with a script in the tactile application, the script comprising the visual representation, the aural representation, and the tactile representation.

11. A method of generating a multimodal sensory experience, comprising:

generating an output using an optical stimulation system, the output operable to excite neural tissue and to induce a tactile sensation in a user of an electronic device based upon a tactile application executable on the electronic device and comprising a simulated object;

selectively directing the output of the stimulation system onto a target area of skin of the user;

modifying one or more characteristics of the output of the stimulation system to induce a tactile representation of the simulated object; and generating a multimodal representation of the simulated object using a multimodal sensory component configured to selectively deliver a multimodal sensory representation of the simulated object.

12. The method of claim 11, wherein a multimodal sensory component comprises one of a display component for displaying a visual representation of the simulated object and a sound component for generating an aural representation of the simulated object.

13. The method of claim 11, further comprising adjusting an onset and offset of each of the tactile sensation, the visual representation, and the aural representation.

14. The method of claim 11, further comprising diminishing an intensity of the optical stimulation system after an initial period of stimulation.

* * * * *